United States Patent [19]
Rathnam

[11] Patent Number: 6,061,519
[45] Date of Patent: *May 9, 2000

[54] EMBEDDING MULTIPLE (NON EMBEDDED) HIGH LEVEL LANGUAGES INTO AN ASSEMBLER CODE

[75] Inventor: Selliah Rathnam, Fremont, Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/859,012

[22] Filed: May 20, 1997

Related U.S. Application Data

[63] Continuation of application No. 08/314,132, Sep. 28, 1994, abandoned.

[51] Int. Cl.[7] ................................................. G06F 9/44
[52] U.S. Cl. ..................... 395/705; 395/702; 395/706; 395/707; 395/710
[58] Field of Search .................... 395/701, 702, 395/705, 708, 703, 704, 706, 707, 710

[56] References Cited

U.S. PATENT DOCUMENTS 5,666,533   9/1997   Horiguchi et al. ...................... 395/670

OTHER PUBLICATIONS

Purtilo, James M., "The POLYITH software bus," ACM Transactions on Programming Languages & Systems, v16, n1, p151(24), Jan. 1994.

Einarsson, et al., "Mixed Language Programming," Software—Practice & Experience, v14, n4, p383–395, Apr. 1984.

Hayes, et al., "Facilitating mixed language programming in distributed systems," IEEE Transactions on Software Engineering, v13, n12, p1254(11), Dec. 1987.

Jenkins, Avery, "Mixed–language programming can be economical, but it has problems," PC Week, v5, n2, p103(2), Dec. 1988.

Jenkins, Avery, "Habit and education assume critical roles in choice of second language," PC Week, v5, n2, p104(1), Dec. 1988.

Wright, et al., "Mixed–language programming with ASM," Dr. Dobb's Journal, v15, n3, p84(10), Mar. 1990.

"Microsoft Press Computer Dictionary, Second Edition," Microsoft Press, Redmond, WA, p. 198, 1993.

Boyd, Stowe, "Module Approach Could Ease SQL and Ada Merger," Government Computer News, v6, n19, p92(4), Sep. 25, 1987.

*Primary Examiner*—Tariq R. Hafiz
*Assistant Examiner*—Todd Ingberg
*Attorney, Agent, or Firm*—Steven F. Caserza; Flehr Hohbach Test Albritton & Herbert

[57] ABSTRACT

A novel method is taught to quickly and easily produce assemer code from a single embedded file which can include high level language code written in any of a number of high level languages interspersed, if desired, among assembler code itself.

23 Claims, 1 Drawing Sheet

EMBEDDING MULTIPLE (NON EMBEDDED) HIGH LEVEL LANGUAGES INTO AN ASSEMBLER CODE

This application is a continuation of U.S. application Ser. No. 08/314,132 filed Sep. 28, 1994, now abandoned.

TECHNICAL FIELD

This invention pertains to computer control, and more specifically to a method and structure for allowing high level language instructions which are embedded within assembler code to be executed as the assembler code itself is executed, or prior to assembler code execution in order to generate a significant portion of the assembler code to be executed.

BACKGROUND

The following terms are used in this specification, and have the following general definitions.

Assembler program: A low-level computer program written in assembler code. It is closely related to the computer's central processing unit or system architecture.

Low-level program: Not easily readable by human, but, it is easily readable by the machine.

High-level program: Easy to read by humans and has rich features of data structure, library routines to aid in programming, and provides many control structures.

Assembler parser program: A program which parses the assembler code and generates the memory image file, which will be used as an input data for validating the CPU.

Macros or Macro processor: A programming feature to expand a given text string into other text string. It can be used to expand from smaller text string to larger text string, to perform arithmetic operations, and to include text string based upon conditions. The cpp and M4 programs, available as part of the UNIX operating system, are two examples of macro processors.

In the development of various types of integrated circuits, a validation step is required in order to test the integrated circuit for proper functionality under a wide variety of conditions. For example, with various input signals applied to an integrated circuit, appropriate output signals are expected. In complex integrated circuits, the required output signals are not only related to the current state of the input signals, but are typically related to a history of input signals which have previously been received, and which establishes a particular set of states within the integrated circuit, including the contents of various registers and buffers. In a microprocessor development project, validation engineers are required to write assembler code of length ranges from hundreds to several thousand lines of assembler code. Smaller programs may be easy to write manually, but it is quite difficult and time consuming to write larger lengths of assembler code, e.g. more than two hundred lines of assembler code.

In the prior art, the step required to manually write large lengths of assembler code is either done entirely manually, or cpp and M4 macros are used to help in writing the large assembler code. However, the use of macros is undesirable due to the following disadvantages.

Macros are complex to use for writing large assembler code as macros are not meant for this purpose. Macros are generally used to substitute small text string with that of another small text string. The primary purpose of macros is to port from one programming environment to another.

Macros do not have very good control and looping features in comparison with that of high-level languages.

Macros do not have as many built-in or library functions as compared with high-level languages such as 'C'.

Generally people are not familiar with Macros.

Another prior art method of writing large lengths of assembler code involves the use of a high level language program to generate certain portions of the assembler code. This high level language is used external to the environment in which the assembler code is written, and the high level language is executed to generate assembler code which is then manually pasted into the appropriate location of the assembler code which is manually written. Thus, the following steps are used in this prior art process of utilizing high level language to generate part of the assembler code.

1) Write some part of the assembler code manually.
2) Use high-level language to generate part of the code as a separate file.
3) Insert generated assembly code during manual generation of assembler code.
4) Repeat steps 2 and 3 as many times as required.
5) Prepare and file assembler file.

While the prior art method (of utilizing high level language to generate part of the assembler code can result in a significant time savings as compared with completely creating entire assembler code manually (which might take on the order of five to ten times the time required to generate assembler code utilizing high level code), there remains a number of disadvantages. First, this prior art method requires multiple iterations of time consuming manual work in order to write the high level code, execute it to generate assembler code, and to paste the assembler code into appropriate locations of the assembler code being manually generated. Furthermore, the high level source code is required to be storeodas a separate file and executed-as a separate file, making organization complex. Also, the final,assembler code file size is large, as no file size savings is achieved utilizing the high level code since the high level code is simply used to generate part of the file assembler code file. Also, this prior art technique does not make it easy to affect changes to the assembler code, since the assembler code itself must be manually changed, or a large part of the assembler code properly determined and removed, the high level language used to generate that part of the assembler code revised and reexecuted, with the resultant revised assembler code pasted in the proper location of the final assembler code file.

Thus, even though there are tools available to assembler code programmers to assist them in generating large assembler code files, it is still time consuming, error prone, and somewhat clumsy.

SUMMARY

In accordance with the teachings of this invention, a novel method is taught to quickly and easily produce assembler code from a single embedded file which can include high level language code written in any of a number of high level languages interspersed, if desired, among assembler code itself.

DETAILED DESCRIPTION

Figure 1:
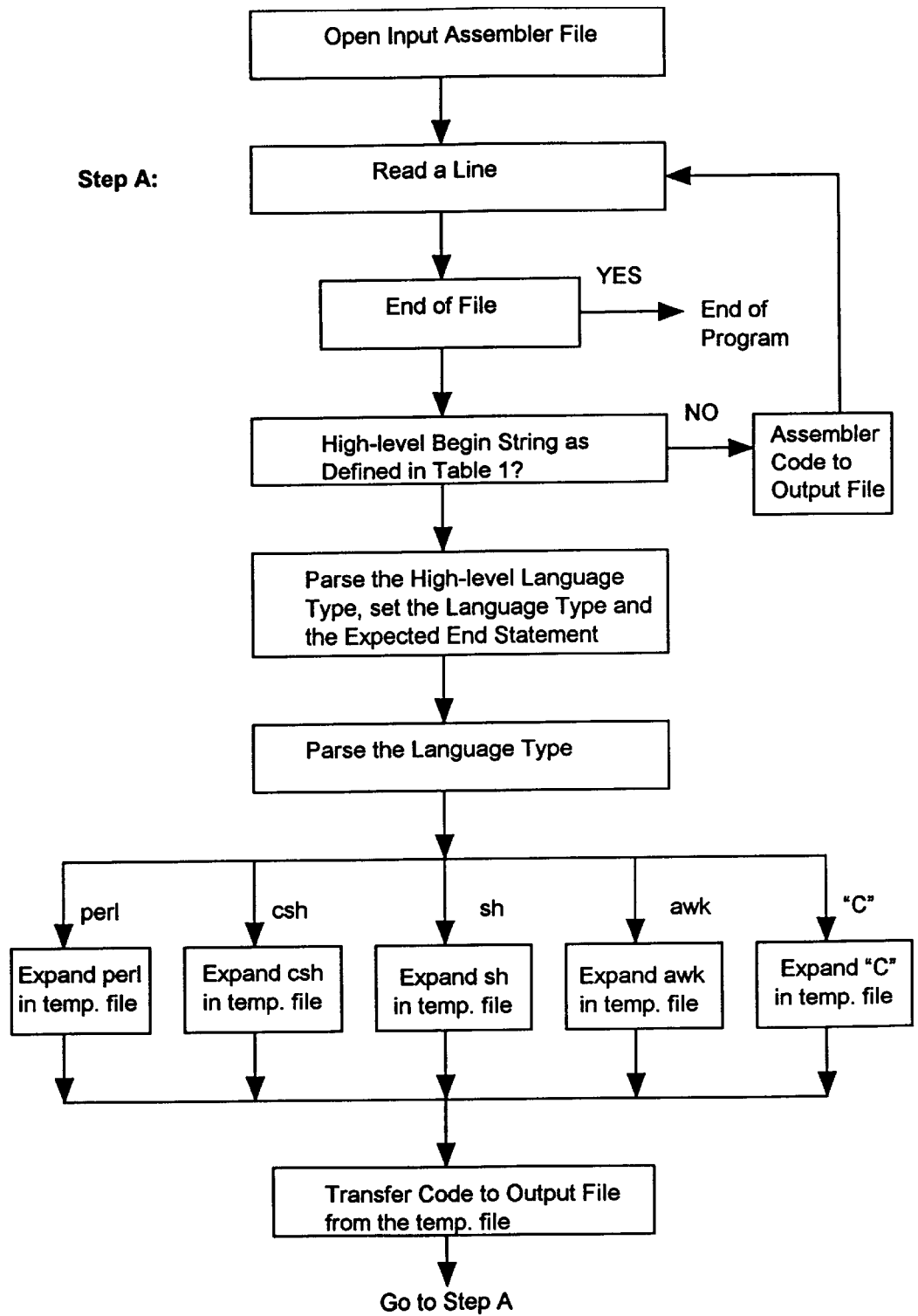
FIG. 1 is a flowchart depicting the operation of one embodiment of this invention.

In accordance with the teachings of this invention, a novel method is used to quickly and easily produce assembler code using two basic steps:

1) Write manual assembler code and high-level program code in a single embedded file, interleaving the assembler code and high-level program code as many times as required in the single embedded file. Any number of high-level languages can be used in the single embedded file, with high level languages preferably identified by '?<program>_start' and'"?<program>_end' strings within the embedded file.

2) Expand the single-embedded file to produce the final assembler code file.

There are a number of significant advantages resulting from the present invention. The present invention makes it significantly simpler for a programmer to generate a very long assembler code by utilizing embedded high level language code within a single embedded file. Furthermore, in accordance with this invention, there is no need to save source files of high level code as separate files for separate execution to generate assembler code which is then pasted into the final assembler code, as a single embedded file contains all of the code, both the manually generated assembler code, and the high-level code which, when compiled generates appropriate portions of the final assembler code. Furthermore, since relatively small lengths of high level language code can generate a virtually unlimited number of lines of assembler code, the single embedded file is of a very small size as compared with the resulting assembler code generated by the compilation of the embedded file. The embedded file will be used as the validation file and it will be used directly in the validation process. Part of the Validation process is to expand the code and to use the resulting assembler program automatically.

In accordance with the teachings of this invention, any number of high level languages are used in a given embedded file, so that a plurality of programmers having different training or preferences can work to prepare a single embedded file. Furthermore, some programmers believe that certain high level languages are more appropriate for certain uses than others, thus leading certain programmers to prefer using one high level language in the embedded file for certain purposes and other high level languages in the embedded file for other purposes. Personal preferences to programming languages differ from person to person. When we compare within high-level languages, 'C' may be better suited to write very complex and larger assembler code than using the 'awk' program. But, awk may be easier to write for simple assembler code. This comparison is generally true. But, the perception of which language is easy to use for a simple and complex application differs from person to person. The primary reason for this behavior is how familiar that person with a given set of programming languages. Furthermore, given the nature of the embedded file, it is quite easy to change portions of the high level code contained within the embedded file and recreate a modified version of the final assembler code.

The following is a description of one embodiment of the present invention described with respect to a program used to expand the embedded code file to generate a final assembler code file. For purposes of this example, this "expansion" program referred to as CAPS, and is written in the Perl language. Naturally, other languages can be used and other approaches to this expander can be provided in accordance with the teachings of this invention. In this example, the following high-level programming languages are supported:

'C',c-shell,Bourne shell, awk, and perl.

It would be appreciated by those of ordinary skill in the art in accordance with the teachings of this invention that it is an easy task to support other high-level languages in the CAPS program, if desired.

In the CAPS program, it is helpful if the high-level languages located within the embedded file are identified as to their beginning, end, and high-level language. Table 1 shows key words suitable for identifying such high-level language code within the embedded file.

TABLE 1

Keywords to identify high-level language codes within the embedded file

| Language:     | Begin statement | End statement |
|---------------|-----------------|---------------|
| 'C' program   | !c_begin        | !c_end        |
| Bourne Shell  | !sh_begin       | !sh_end       |
| c-Shell       | !csh_begin      | !csh_end      |
| Awk           | !nawk_begin     | !nawk_end     |
| perl          | !perl_begin     | !perl_end     |

The following steps are used by a programmer to create the embedded file, including high-level language embedded within assembler code:

1) Use the appropriate begin and end statement as defined in Table 1 for the language chosen.
2) Write the assembler code generation program in the high-level language within the begin-end block.
3) Use additional assembler language directly without any begin-end statement, if required.
4) Use CAPS program to expand the high-level languages into the assembler code.

Of interest, the user needs only to use the CAPS program for testing purposes. Otherwise, we can incorporate CAPS into the assembler parser program and the user need not expand the test code written in high-level languages, as the CAPS program is part of the Validation tool set and during the CPU validation process, the CAPS program used expand the code automatically.

The following is an example of initialization of registers using manually written assembler codes:

```
mov %g0, %i0
mov %g0, %i1
mov %g0, %i2
mov %g0, %i3
mov %g0, %i4
mov %g0, %i5
mov %g0, %i6
mov %g0, %i7
mov %g0, %l0
mov %g0, %l1
mov %g0, %l2
mov %g0, %l3
mov %g0, %l4
mov %g0, %l5
mov %g0, %l6
mov %g0, %l7
mov %g0, %o0
mov %g0, %o1
mov %g0, %o2
mov %g0, %o3
mov %g0, %o4
mov %g0, %o5
mov %g0, %o6
mov %g0, %o7
```

In accordance with the teachings of this invention, the above register initialization is achieved in a much simpler fashion, utilizing a single embedded code file, for example as follows:

```
!perl_begin
    @regc = ( "i", "l", "o" );
    foreach $r ( 0 .. $#regc ) {
        for ($i = 0; $i <= 7; $i++ ) {
            print "\tmov %g0, %$regc[$r]$i\n";
        }
    }
!perl_end
```

As another, and more complex example, the following is an example of an embedded code file including manually written assembler code and embedded high level language code, written in high-level languages, 'perl', 'c', and awk.

```
user_text_start :
main:
!perl_begin
    @regc = ( "g", "o");
    foreach $r ( 0 .. $#regc ) {
        print "\n\nreg_$regc[$r]_init:\n";
        for ( $i = 0; $i <= 7; $i++ ) {
            print "\tmov %g0, %$regc[$r]$i\n";
        }
    }
    @regc = ( "l");
    foreach $r ( 0 .. $#regc ) {
        print "\n\nreg_$regc[$r]_i_init:\n";
        for ( $i = 0; $i <= 7; $i++) {
            if ( $i <= 5 ) {
                print "\tset page_$i, %$regc[$r]$i\n";
            }
            else {
                print "\tset nc_page_$i, %$regc[$r]$i\n";
            }
            print "\tmov %$reqc[$r]$i, %i$i\n";
        }
    }
!perl_end
    !# define f0 and f1
        ldd     [%l0], %f0
!#------------------------------------------------------------
!#  body_cprog.i file contains 'c' code and this code will
!#  generate assembler code using CAPS program during
!#  the validation process.
!#
!#
!#  To run with random seed:
!#          1) comment out SEED_INIT definition
!#          2) set '1' to SBTHRASH_RANDOM_SEED
!#
!#------------------------------------------------------------
!c_begin
#define     SEED_INIT 0x1234
#define     SBTHRASH_RANDOM_SEED 1      /* random seed; SEED_INIT
will not be used */
/* SBTHRASH Test:
    Most of the 'c' code is borrowed from dtharsh test.
    Redistributed the ld,lda,st,sta usage to generate maximum
    amount of store. Also, I and D TLB lock is done randomly.
    Required parameters are defined as cpp macros. No need to
    change the code to generate variable no. of instrs., or
    number of tlb entry locking.
*/
#include <stdio.h>
#define     NO_OF_INSTRS        3000
#define     LOCK_DTLB_ENTRIES   59
#define     LOCK_ITLB_ENTRIES   13
#define     DTLB_ENTRIES        64
#define     ITLB_ENTRIES        16
#define TABLEWALKS 20
/* this causes table walks every TABLEWALKS operations, min =16
*/
/* NOTE: operations are about 2.4 instructions each (1-3), NOT
    one cycle */
/* warning, this explodes the size of mem.dat */
int icount. = 0;
```

-continued

```
int tlb_lock_flag[100];
int tlb_lock_count;
print_ins (ins_buf)
char *ins_buf;
{
    icount++;
    if ( ( icount % 10 ) == 0 ) {
        printf ("sbthrash_ins_count_%d:\n", icount);
    }
    printf("%s", ins_buf);
}
init_tlb_lock_flag(num)
{
    while ( num-- )
        tlb_lock_flag[num] = 0;
}
main(argc, argv)
    int argc;
    char**argv;
{
    long randnum;
    int page, offset, accsize, align;
    char *sizestr, *signstr;
    int fi;
    char ins_buf[128];
    int tlb_index;
    int seed_init;
    long random();
        char *transparent="0"; /* change here to move PA space */
        int PAGES= 0x8; /* A % is silly if pages=8, wasn't always
        */
        int RANGE= 0x3f; /* 63: offset range, 31 for one line, 63
        for two. */
#if ( SBTHRASH_RANDOM_SEED == 1 )
    seed_init = getpid();
    printf("\n!#\t\t\tNOTE:    USING RANDOM SEED ( 0x%x)\n",
seed_init);
    fprintf(stderr, "\n\t\t\tNOTE:    USING RANDOM SEED (
0x%x)\n", seed_init);
#else
    seed_init = SEED_INIT;
    fprintf(stderr, "\n\t\t\tNOTE: USING SEED VALUE ( 0x%x)\n",
seed_init);
#endif
    /* if(argc!=3)printf("usage: body randseed numops\n");*/
    srandom(seed_init);
    /*
==============================================================
            generate instr. to display the SEED_INIT value
            and no. of instrs in.sim.*log
==============================================================
            */
    printf("seed_init:\n\tset 0x%x, %%g3\n\n", seed_init);
    printf("no_of_instrs:\n\tset 0x%x, %%g4\n\n", NO_OF_INSTRS);
    /*
==============================================================
            generate instr. to lock DTLB entries
==============================================================
            */
    printf("\tmov\t0x1, %%g1\n");
     printf("\n\ndtlb_lock_%d_entries_in_random:\n",
LOCK_DTLB_ENTRIES);
    init_tlb_lock_flag(DTLB_ENTRIES );
    for (fi = 0; fi <LOCK_DTLB_ENTRIES ; fi ++ ) {
        for ( ; ; ) {
        tlb_index = (random() & 0x3f);
        if ( ! tlb_lock_flag[tlb_index] ) break;
        }
        tlb_lock_flag[tlb_index] = 1;
        printf("dtlb_lock_%d_%d:\n\tset   0x%x,   %%g2\n",   fi,
tlb_index, ((tlb_index*4096) + 768) );
        printf("\tsta\t%%g1, [%%g2] MTEST_TLB_LOCK_ASI\n");
    }
    printf("\n");
    /*
==============================================================
            generate instr. to lock ITLB entries
==============================================================
            */
```

-continued

```
        printf("\n\nitlb_lock_%d_entries_in_random:\n",
LOCK_ITLB_ENTRIES);
    init_tlb_lock_flag(ITLB_ENTRIES );
    for (fi = 0; fi <LOCK_ITLB_ENTRIES ; fi ++ ) {
        for ( ; ; ) {
        tlb_index = (random() & 0xf);
        if ( ! tlb_lock_flag[tlb_index] ) break;
        }
        tlb_lock_flag[tlb_index] = 1;
        printf("itlb_lock_%d_%d:\n\tset    0x%x,    %%g2\n",    fi,
tlb_index, ((tlb_index.*4096) + 768) );
        printf("\tsta\t%%g1, [%%g2] MTESTI_TLB_LOCK_ASI\n");
    }
    printf("\n");
    printf("\tmov\t%%g0, %%g1\n");
    printf("\tmov\t%%g0, %%g2\n");
    printf("\tmov\t%%g0, %%g3\n");
    printf("\tmov\t%%g0, %%g4\n");
    printf("\n\n\n");
    printf("sbthrash_start:\n");
    icount = 0;
    for(; ;){ /* Infinite loop */
        if ( icount >= NO_OF_INSTRS ) break;
        randnum=random();
        page = (randnum & 0xff) % PAGES;
        offset = ((randnum>> 8) & RANGE);
        /* accsize determines the byte/half/word/double */
        accsize = (randnum>> 14 ) & 3;
        /* signstr may cause unsigned byte or half */
        signstr = (randnum>> 16 )&1?"u":"s";
        /* align rounds offset for that size */
        align=offset; sizestr = "b";
        if(accsize==1) {align &= ~1; sizestr = "h";}
        if(accsize==2) {align &= ~3; sizestr = " "; signstr=" ";}
        if(accsize==3) {align &= ~7; sizestr = "d"; signstr=" ";
page &= ~1;}
        /*printf("rnum=%x,    page=%d,    offset=%d,    accsize=%d,
align=%d\n",randnum, page, offset, accsize, align);*/
        switch((randnum>>17) & 0x7 ) {
        /* 4 - regular store, 2 sta, 1 ld */
        case 0:          /* free fall */
        case 1:          /* free fall */
        case 2:          /* free fall */
        case 3: /* ST */
        sprintf(ins_buf, "\tst%s\t%%i%i, [%%l%i+%i]\n", sizestr,
page, page, align); print_ins(ins_buf);
            sprintf(ins_buf,    "\tinc\t%%i%i\n",    page) ;
print_ins(ins_buf);
        break;
        case 4:          /* free fall */
        case 5: /* STA user/super instruction/data access */
        sprintf(ins_buf, "\tadd\t%d,    %%l%i,    %%g%i\n", align,
page, page?page:1); print_ins(ins_buf);
        sprintf(ins_buf,    "\tst%sa\t%%i%i,    [%%g%i]    0x%X\n",
sizestr,    page,    page?page:1,    8+((randnum>>20)    &    3));
print_ins(ins_buf);
            sprintf(ins_buf,    "\tinc\t%%i%i\n",    page) ;
print_ins(ins_buf);
        break;
        case 6: /* LD) */
        sprintf(ins_buf,    "\tld%s%s\t(%%l%i+%i],    %%o%i\n",
signstr, sizestr, page, align, page); print_ins(ins_buf);
        break;
        case 7:
        switch ((randnum>>20) & 0x7) {
        case 0:          /* free fall */
        case 1:          /* free fall */
        case 2:          /* free fall */
        case 3: /* LDA transparent, if page=0, can't use reg
%g0, overuse %g1 */
            sprintf(ins_buf, "\tadd\t%d, %%l%i, %%g%i\n", align,
page, page?page:1); print_ins(ins_buf);
            sprintf(ins_buf, "\tld%s%sa\t[%%g%i] 0x2%s, %%o%i\n",
signstr,    sizestr,    page?page:1,    transparent,    page);
print_ins(ins_buf);
            break;
        case 4: /* LDSTUB */
            sprintf(ins_buf, "\tmov\t%%i%i, %%o%i\n", page, page);
print_ins(ins_buf);
```

-continued

```
                sprintf(ins_buf,   "\tldstub\t[%%l%i+%i],    %%o%i\n",
page, offset, page); print_ins(ins_buf);
                sprintf(ins_buf,   "\tinc\t%%i%i\n",    page);
print_ins(ins_buf);
                break;
            case 5:
            case 6: /* ST with FBUSY */
                sprintf(ins_buf,   "\tfmovs\t%%f0,    %%f1\n")
print_ins(ins_buf);
                sprintf(ins_buf, "\tst\t%%f1, [%%l%i+%i]\n", page,
offset & ~3); print_ins(ins_buf);
                break;
            case 7: /* LD with FBUSY */
                sprintf(ins_buf,  "\tld\t[%%l%i+%i],    %%f0\n", page,
offset & ~3); print_ins(ins_buf);
                sprintf(ins_buf,   "\tfmovs\t%%f0,    %%f1\n");
print_ins(ins_buf);
                break;
            default: fprintf( stderr, "switch: internal error\n");
            }
        }
#ifdef TABLEWALKS
        if(!(icount%TABLEWALKS)) {
            sprintf(ins_buf,   "\tba\t1f\n\tnop\n.align
0x800\n.skip 0x7C0\n1:\n");    print_ins(ins_buf);
        }
        /* 16 inst, two lines before bage boundary */
#endif
    } /* for(; ;) */
    exit(0);
}
!c_end
!nawk_begin
    BEGIN {
        printf("\n\n!\t Store o register values\n");
        for (i = 0; i <= 7 ; i++ ) {
            printf("\tst %%o%d, [%%l%d]\n", i, i );
        }
    }
!nawk_end
        ta    GOOD_TRAP
user_text_end:
```

The resultant assembler code after expanding the above embedded file utilizing the CAPS program is shown in appendix I:

FIG. 1 is a flow chart depicting the operation of one embodiment of an expansion program such as the CAPS program to read an input assembler file and expand embedded high level language code statements to generate a final output code file which is written completely in assembler code. As shown in FIG. 1, first the input assembler code file is read and a determination is made as to whether a high level begin string is found. If a high level begin string is not found, that line of assembler code is written to the output file, and the next input file line is read. If a high level begin string is located, the high level language type is determined based on, for example, information contained in the high level language begin string. Then, code expansion is performed on the high level code to generate assembler code, until such time as the high level language end statement is reached, indicating the conclusion of that high level language string in the embedded input file. This generated assembler code is then output to the output file, and a return is made to continue reading the input file.

```

#========================================================
#       %W%                 %G%
#========================================================
# Program to expand shell, awk, perl and 'c' code in asm file.
#       The perl block starts with '!perl_begin' string
#       and ends with '!perl_end' string
#   Other blocks:
#       sh block:          !sh_begin    to !sh_end
#       csh block:         !csh_begin   to !csh_end
#       awk block:         !nawk_begin  to !nawk_end
#       c block:           !c_begin     to !c_end

#========================================================
( $#ARGV == 1 ) || die("Usage: $0 <input file> <output file>
\n");
#-----------------------------------------------
# get input file
#-----------------------------------------------
$infile = shift;
#-----------------------------------------------
# get outfile
#-----------------------------------------------
$outfile = shift;
$tmpFile1 = "/tmp/$infile.1.$$.c";
$tmpFile2 = "/tmp/$infile.2.$$";
$tmpFile3 = "/tmp/$infile.3.$$";
$perl_begin_str   = 'perl_begin';
$perl_end_str     = 'perl_end';
```

```
$nawk_begin_str    = 'nawk_begin';
$nawk_end_str      = 'nawk_end';
$csh_begin_str     = 'csh_begin';
$csh_end_str       = 'csh_end';
$sh_begin_str      = 'sh_begin';
$sh_end_str        = 'sh_end';
$c_begin_str       = 'c_begin';
$c_end_str         = 'c_end';
$tasks_str         = 'tasks';
$val = &main_prog();
unlink($tmpFile1);
unlink($tmpFile2);
unlink($tmpFile3);
exit($val);
# MAIN Func.
sub main_prog {
    open(FH, "<$infile") ||
        die "Can't open file $infile in 'r' mode: $!\n";
    open(FHOUT, ">$outfile") ||
        die "Can't open file $outfile in 'w' mode: $!\n";
    $tasks_flag = 0;
    $n = 0;
    while (<FH>) {
        chop;
        #print "|$_|\n";
        $n++;
        if ( /^\!$tasks_str/ ) {
            $tasks_flag = 1;
        }
        if      (    /^\!$perl_begin_str/   ||
/^\!$nawk_begin_str/ ||
                /^\!$sh_begin_str/ || /^\!$c_begin_str/
||
                /^\!$csh_begin_str/
                                                        ) {
            if  ( /^\!$perl_begin_str/ ) {
                $type = "perl";
                $end_str = "$perl_end_str";
            }
            elsif ( /^\!$nawk_begin_str/ ) {
                $type = "nawk";
                $end_str = "$nawk_end_str";
            }
            elsif ( /^\!$csh_begin_str/ ) {
                $type = "csh";
                $end_str = "$csh_end_str";
            }
            elsif ( /^\!$sh_begin_str/ ) {
                $type = "sh";
                $end_str = "$sh_end_str";
            }
            elsif ( /^\!$c_begin_str/ ) {
                $type = "c";
                $end_str = "$c.end_str";
            }
            print FHOUT "/* $_ */\n";
            $block_begin_ln = $n;
            $val    =  &expand_prog($type,   $end_str,
$tasks_flag);
            if ( $val != 0 ) {
                print STDERR "\tError: $type expansion
failed\n";
                exit(-1);
            }
        }
        print FHOUT "$_\n";
    }
    close(FH);
    close(FHOUT);
    0;
}
sub expand_prog {
    local($type, $end_str, $tasks_flag) = @_;
    open(FHOUT_PROG, ">$tmpFile1") ||
        die "Can't open file $tmpFile1 in 'w' mode: $!\n";
    if ( $type eq "perl" ) {
        $val = &output_perl_header;
    }
    while (<FH>) {
        chop;
        #print "|$_|\n";
        $n++;
        if ( /^\!$end_str/ ) {
            $line "$_" ;
            $block_end_ln = $n;
            if ( $type eq "perl" ) {
                print FHOUT_PROG "exit(0); \n";
                close FHOUT_PROG;
                print STDERR "\n\t Expanding Perl Code from
line $block_begin_ln
to $block_end_ln
\n";
                print STDERR "\t\tchmod +x $tmpFile1; $tmpFile1\n";
                $val = system("chmod +x $tmpFile1; $tmpFile1 >
$tmpFile2");
            }
            elsif ( $type eq "csh" ) {
                print FHOUT_PROG "exit \$status; \n";
                close FHOUT_PROG;
                print STDERR "\n\t Expanding Shell Code
from line $block_begin_ln   to $block_end_ln
\n";
                print  STDERR   "\t\tchmod +x $tmpFile1;
$tmpFile1\n";
                $val = system("chmod +x $tmpFile1; $tmpFile1 >
$tmpFile2");
            }
            elsif ( $type eq "sh" ) {
                print FHOUT_PROG "exit 0; \n";
                close FHOUT_PROG;
                print STDERR "\n\t Expanding Shell Code from line
$block_begin_ln   to $block_end_ln
\n";
                print  STDERR   "\t\tchmod +x $tmpFile1;
$tmpFile1\n";
                $val = system("chmod +x $tmpFile1; $tmpFile1 >
$tmpFile2");
            }
            elsif ( $type eq "nawk" ) {
                close FHOUT_PROG;
                print STDERR "\n\t Expanding Nawk Code from line
$block_begin_ln to $block_end_ln
\n";
                print STDERR "\t\tnawk   -f   $tmpFile1 \n";
                $val = system("nawk    -f    $tmpFile1 >
$tmpFile2");
            }
            elsif ( $type eq "c" ) {
                close FHOUT_PROG;
                print STDERR "\n\t Expanding C Code from line
$block_begin_ln
to $block_end_ln
\n";
                print STDERR "/t/tacc -g -I. $tmpFile1 -o $tmpFile3 &&
$tmpFile3 \n";
                $val =
system("acc -g -I. $tmpFile1 -o $tmpFile3 && chmod
+x $tmpFile3 && $tmpFile3 > $tmpFile2");
            }
            else {
                print STDERR "\tError:
Internal error in expand_prog 'if end_str'\n";
                exit(-1);
            }
            if ( $val != 0 ) {
                print STDERR "\tError: $type expansion
failed\n";
                exit(-1);
            }
            $val = &transfer_to_outfile($tmpFile2);
            print FHOUT "/* $line */\n";
            last;
        }
        if      (       /^\!$perl_begin_str/      ||
/^\!$nawk_begin_str/
```

-continued

```
                || /^\!$sh_begin_str/ ||
                            /^\!$perl_end_str/        ||
/^\!$nawk_end_str/ ||
                /^\!$sh_end_str/ || /^\!$csh_end str/
) {
                        print STDERR "\tError: Illegal
block end str at line $n;    $type block started
at $ln \n";
                                exit(-1);
        }
        print FHOUT_PROG "$_\n";
    }
    0 ;
}
sub output_perl_header {
    print FHOUT_PROG ":\n" ;
    print FHOUT_PROG 'eval \'(exit $?0)\' && eval \'exec
perl -S $0 ${1+"$@"}\'';
    print FHOUT_PROG "\n";
    print FHOUT_PROG '        & eval \'exec perl -S $0
$argv:q\'';
    print FHOUT_PROG "\n";
    print FHOUT_PROG "if 0;\n";
    print FHOUT_PROG '# !!!!!!!!!! above is required, funny
way to start perl !!!!!!!!!!!';
```

-continued

```
    print FHOUT_PROG "\n\n\n";
}
sub transfer_to_outfile {
    local($file) = @_;
    open(FH_LOC, "<$file")    ||
                die "Can't open file $file in 'r' mode:
$!\n";
    while (<FH_LOC>) {
        print FHOUT "$_";
    }
    close(FH_LOC);
}
```

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

APPENDIX I

```
 1
 2
 3  Expanded test code:
 4  ------------------
 5  user_text_start :
 6  main:
 7
 8  /* !perl_begin */
 9
10
11  reg_g_init:
12       mov %g0, %g0
13       mov %g0, %g1
14       mov %g0, %g2
15       mov %g0, %g3
16       mov %g0, %g4
17       mov %g0, %g5
18       mov %g0, %g6
19       mov %g0, %g7
20
21
22  reg_o_init:
23       mov %g0, %o0
24       mov %g0, %o1
25       mov %g0, %o2
26       mov %g0, %o3
27       mov %g0, %o4
28       mov %g0, %o5
29       mov %g0, %o6
30       mov %g0, %o7
31
32
33  reg_l_i_init:
34       set  page_0, %l0
35       mov %l0,  %i0
36       set  page_1, %l1
37       mov %l1,  %i1
38       set  page_2, %l2
```

```
1        mov    %l2,  %i2
2        set    page_3, %l3
3        mov    %l3,  %i3
4        set    page_4, %l4
5        mov    %l4,  %i4
6        set    page_5, %l5
7        mov    %l5,  %i5
8        set    nc_page_6, %l6
9        mov    %l6,  %i6
10       set    nc_page_7, %l7
11       mov    %l7,  %i7
12  /* !perl_end */
13
14
15
16       !# define f0 and f1
17       ldd    [%l0], %f0
18
19  !#------------------------------------------------------------
20  !#  body_cprog.i file contains 'c' code and this code will
21  !#      generate assembler code using CAPS program during
22  !#      the validation process.
23  !#
24  !#
25  !#  To run with random seed:
26  !*              1) comment out SEED_INIT definition
27  !#              2) set '1' to SBTHRASH_RANDOM_SEED
28  !#
29  !#------------------------------------------------------------
30
31
32  /* !c_begin */
33
34  !#              NOTE:  USING RANDOM SEED ( 0x5063)
35  seed_init:
36       set    0x5063, %g3
37
38  no_of_instrs:
```

```
 1      set  0xbb8, %g4
 2
 3      mov  0x1, %g1
 4
 5
 6  dtlb_lock_59_entries_in_random:
 7  dtlb_lock_0_50:
 8      set  0x32300, %g2
 9      sta  %g1, [%g2] MTEST_TLB_LOCK_ASI
10  dtlb_lock_1_28:
11      set  0x1c300, %g2
12      sta  %g1, [%g2] MTEST_TLB_LOCK_ASI
13  dtlb_lock_2_26:
14      set  0x1a300, %g2
15      sta  %g1, [%g2] MTEST_TLB_LOCK_ASI
16  dtlb_lock_3_4:
17      set  0x4300, %g2
18      sta  %g1, [%g2] MTEST_TLB_LOCK_ASI
19  dtlb_lock_4_5:
20      set  0x5300, %g2
21      sta  %g1, [%g2] MTEST_TLB_LOCK_ASI
22  dtlb_lock_5_48:
23      set  0x30300, %g2
24      sta  %g1, [%g2] MTEST_TLB_LOCK_ASI
25  dtlb_lock_6_0:
26      set  0x300, %g2
27      sta  %g1, [%g2] MTEST_TLB_LOCK_ASI
28  dtlb_lock_7_1:
29      set  0x1300, %g2
30      sta  %g1, [%g2] MTEST_TLB_LOCK_ASI
31  dtlb_lock_8_46:
32      set  0x2e300, %g2
33      sta  %g1, [%g2] MTEST_TLB_LOCK_ASI
34  dtlb_lock_9_49:
35      set  0x31300, %g2
36      sta  %g1, [%g2] MTEST_TLB_LOCK_ASI
37  dtlb_lock_10_62:
38      set  0x3e300, %g2
```

```
 1      sta   %g1, [%g2] MTEST_TLB_LOCK_ASI
 2  dtlb_lock_11_56:
 3      set 0x38300, %g2
 4      sta   %g1, [%g2] MTEST_TLB_LOCK_ASI
 5  dtlb_lock_12_40:
 6      set 0x28300, %g2
 7      sta   %g1, [%g2] MTEST_TLB_LOCK_ASI
 8  dtlb_lock_13_45:
 9      set 0x2d300, %g2
10      sta   %g1, [%g2] MTEST_TLB_LOCK_ASI
11  dtlb_lock_14_16:
12      set 0x10300, %g2
13      sta   %g1, [%g2] MTEST_TLB_LOCK_ASI
14  dtlb_lock_15_27:
15      set 0x1b300, %g2
16      sta   %g1, [%g2] MTEST_TLB_LOCK_ASI
17  dtlb_lock_16_43:
18      set 0x2b300, %g2
19      sta   %g1, [%g2] MTEST_TLB_LOCK_ASI
20  dtlb_lock_17_55:
21      set 0x37300, %g2
22      sta   %g1, [%g2] MTEST_TLB_LOCK_ASI
23  dtlb_lock_18_33:
24      set 0x21300, %g2
25      sta   %g1, [%g2] MTEST_TLB_LOCK_ASI
26  dtlb_lock_19_9:
27      set 0x9300, %g2
28      sta   %g1, [%g2] MTEST_TLB_LOCK_ASI
29  dtlb_lock_20_20:
30      set 0x14300, %g2
31      sta   %g1, [%g2] MTEST_TLB_LOCK_ASI
32  dtlb_lock_21_37:
33      set 0x25300, %g2
34      sta   %g1, [%g2] MTEST_TLB_LOCK_ASI
35  dtlb_lock_22_6:
36      set 0x6300, %g2
37      sta   %g1, [%g2] MTEST_TLB_LOCK_ASI
38  dtlb_lock_23_38:
```

```
1        set 0x26300, %g2
2        sta  %g1, [%g2] MTEST_TLB_LOCK_ASI
3   dtlb_lock_24_39:
4        set 0x27300, %g2
5        sta  %g1, [%g2] MTEST_TLB_LOCK_ASI
6   dtlb_lock_25_30:
7        set 0x1e300, %g2
8        sta  %g1, [%g2] MTEST_TLB_LOCK_ASI
9   dtlb_lock_26_22:
10       set 0x16300, %g2
11       sta  %g1, [%g2] MTEST_TLB_LOCK_ASI
12  dtlb_lock_27_36:
13       set 0x24300, %g2
14       sta  %g1, [%g2] MTEST_TLB_LOCK_ASI
15  dtlb_lock_28_8:
16       set 0x8300, %g2
17       sta  %g1, [%g2] MTEST_TLB_LOCK_ASI
18  dtlb_lock_29_53:
19       set 0x35300, %g2
20       sta  %g1, [%g2] MTEST_TLB_LOCK_ASI
21  dtlb_lock_30_35:
22       set 0x23300, %g2
23       sta  %g1, [%g2] MTEST_TLB_LOCK_ASI
24  dtlb_lock_31_41:
25       set 0x29300, %g2
26       sta  %g1, [%g2] MTEST_TLB_LOCK_ASI
27  dtlb_lock_32_44:
28       set 0x2c300, %g2
29       sta  %g1, [%g2] MTEST_TLB_LOCK_ASI
30  dtlb_lock_33_21:
31       set 0x15300, %g2
32       sta  %g1, [%g2] MTEST_TLB_LOCK_ASI
33  dtlb_lock_34_24:
34       set 0x18300, %g2
35       sta  %g1, [%g2] MTEST_TLB_LOCK_ASI
36  dtlb_lock_35_31:
37       set 0x1f300, %g2
38       sta  %g1, [%g2] MTEST_TLB_LOCK_ASI
```

```
1    dtlb_lock_36_58:
2        set 0x3a300, %g2
3        sta %g1, [%g2] MTEST_TLB_LOCK_ASI
4    dtlb_lock_37_60:
5        set 0x3c300, %g2
6        sta %g1, [%g2] MTEST_TLB_LOCK_ASI
7    dtlb_lock_38_32:
8        set 0x20300, %g2
9        sta %g1, [%g2] MTEST_TLB_LOCK_ASI
10   dtlb_lock_39_25:
11       set 0x19300, %g2
12       sta %g1, [%g2] MTEST_TLB_LOCK_ASI
13   dtlb_lock_40_18:
14       set 0x12300, %g2
15       sta %g1, [%g2] MTEST_TLB_LOCK_ASI
16   dtlb_lock_41_59:
17       set 0x3b300, %g2
18       sta %g1, [%g2] MTEST_TLB_LOCK_ASI
19   dtlb_lock_42_2:
20       set 0x2300, %g2
21       sta %g1, [%g2] MTEST_TLB_LOCK_ASI
22   dtlb_lock_43_23:
23       set 0x17300, %g2
24       sta %g1, [%g2] MTEST_TLB_LOCK_ASI
25   dtlb_lock_44_13:
26       set 0xd300, %g2
27       sta %g1, [%g2] MTEST_TLB_LOCK_ASI
28   dtlb_lock_45_17:
29       set 0x11300, %g2
30       sta %g1, [%g2] MTEST_TLB_LOCK_ASI
31   dtlb_lock_46_19:
32       set 0x13300, %g2
33       sta %g1, [%g2] MTEST_TLB_LOCK_ASI
34   dtlb_lock_47_12:
35       set 0xc300, %g2
36       sta %g1, [%g2] MTEST_TLB_LOCK_ASI
37   dtlb_lock_48_29:
38       set 0x1d300, %g2
```

```
1        sta   %g1, [%g2] MTEST_TLB_LOCK_ASI
2   dtlb_lock_49_63:
3        set 0x3f300, %g2
4        sta   %g1, [%g2] MTEST_TLB_LOCK_ASI
5   dtlb_lock_50_57:
6        set 0x39300, %g2
7        sta   %g1, [%g2] MTEST_TLB_LOCK_ASI
8   dtlb_lock_51_42:
9        set 0x2a300, %g2
10       sta   %g1, [%g2] MTEST_TLB_LOCK_ASI
11  dtlb_lock_52_14:
12       set 0xe300, %g2
13       sta   %g1, [%g2] MTEST_TLB_LOCK_ASI
14  dtlb_lock_53_7:
15       set 0x7300, %g2
16       sta   %g1, [%g2] MTEST_TLB_LOCK_ASI
17  dtlb_lock_54_61:
18       set 0x3d300, %g2
19       sta   %g1, [%g2] MTEST_TLB_LOCK_ASI
20  dtlb_lock_55_3:
21       set 0x3300, %g2
22       sta   %g1, [%g2] MTEST_TLB_LOCK_ASI
23  dtlb_lock_56_51:
24       set 0x33300, %g2
25       sta   %g1, [%g2] MTEST_TLB_LOCK_ASI
26  dtlb_lock_57_52:
27       set 0x34300, %g2
28       sta   %g1, [%g2] MTEST_TLB_LOCK_ASI
29  dtlb_lock_58_47:
30       set 0x2f300, %g2
31       sta   %g1, [%g2] MTEST_TLB_LOCK_ASI
32
33
34
35  itlb_lock_13_entries_in_random:
36  itlb_lock_0_10:
37       set 0xa300, %g2
38       sta   %g1, [%g2] MTESTI_TLB_LOCK_ASI
```

```
1    itlb_lock_1_13:
2         set 0xd300, %g2
3         sta %g1, [%g2] MTESTI_TLB_LOCK_ASI
4    itlb_lock_2_6:
5         set 0x6300, %g2
6         sta %g1, [%g2] MTESTI_TLB_LOCK_ASI
7    itlb_lock_3_14:
8         set 0xe300, %g2
9         sta %g1, [%g2] MTESTI_TLB_LOCK_ASI
10   itlb_lock_4_4:
11        set 0x4300, %g2
12        sta %g1, [%g2] MTESTI_TLB_LOCK_ASI
13   itlb_lock_5_11:
14        set 0xb300, %g2
15        sta %g1, [%g2] MTESTI_TLB_LOCK_ASI
16   itlb_lock_6_1:
17        set 0x1300, %g2
18        sta %g1, [%g2] MTESTI_TLB_LOCK_ASI
19   itlb_lock_7_15:
20        set 0xf300, %g2
21        sta %g1, [%g2] MTESTI_TLB_LOCK_ASI
22   itlb_lock_8_7:
23        set 0x7300, %g2
24        sta %g1, [%g2] MTESTI_TLB_LOCK_ASI
25   itlb_lock_9_0:
26        set 0x300, %g2
27        sta %g1, [%g2] MTESTI_TLB_LOCK_ASI
28   itlb_lock_10_8:
29        set 0x8300, %g2
30        sta %g1, [%g2] MTESTI_TLB_LOCK_ASI
31   itlb_lock_11_3:
32        set 0x3300, %g2
33        sta %g1, [%g2] MTESTI_TLB_LOCK_ASI
34   itlb_lock_12_9:
35        set 0x9300, %g2
36        sta %g1, [%g2] MTESTI_TLB_LOCK_ASI
37
38        mov %g0, %g1
```

```
1        mov    %g0, %g2
2        mov    %g0, %g3
3        mov    %g0, %g4
4
5
6
7   sbthrash_start:
8        sth    %i1, [%l1+24]
9        inc    %i1
10       add    7, %l6, %g6
11       stba   %i6, [%g6] 0x9
12       inc    %i6
13       ld     [%l6+32], %f0
14       fmovs  %f0, %f1
15       ldd    [%l4+16], %o4
16       st     %i4, [%l4+60]
17  sbthrash_ins_count_10:
18       inc    %i4
19       sth    %i4, [%l4+62]
20       inc    %i4
21       sth    %i7, [%l7+22]
22       inc    %i7
23       add    31, %l7, %g7
24       stba   %i7, [%g7] 0x9
25       inc    %i7
26       add    46, %l0, %g1
27       stha   %i0, [%g1] 0x9
28  sbthrash_ins_count_20:
29       inc    %i0
30       ba     1f
31       nop
32  .align 0x800
33  .skip 0x7C0
34  1:
35       st     %i6, [%l6+52]
36       inc    %i6
37       fmovs  %f0, %f1
38       st     %f1, [%l2+40]
```

```
1       add   63, %l5, %g5
2       stba  %i5, [%g5] 0xA
3       inc   %i5
4       stb   %i5, [%l5+39]
5    sbthrash_ins_count_30:
6       inc   %i5
7       add   0, %l0, %g1
8       sta   %i0, [%g1] 0x8
9       inc   %i0
10      add   58, %l3, %g3
11      stha  %i3, [%g3] 0xA
12      inc   %i3
13      lduh  [%l1+14], %o1
14      ldsb  [%l3+4], %o3
15      add   20, %l7, %g7
16   sbthrash_ins_count_40:
17      ldsba    [%g7] 0x20, %o7
18      ba    1f
19      nop
20      .align 0x800
21      .skip 0x7C0
22   1:
23      st    %i2, [%l2+56]
24      inc   %i2
25      stb   %i7, [%l7+23]
26      inc   %i7
27      st    %i4, [%l4+12]
28      inc   %i4
29      stb   %i2, [%l2+51]
30      inc   %i2
31   sbthrash_ins_count_50:
32      ldsb  [%l5+38], %o5
33      stb   %i2, [%l2+52]
34      inc   %i2
35      std   %i0, [%l0+8]
36      inc   %i0
37      add   32, %l0, %g1
38      stda  %i0, [%g1] 0xB
```

```
1       inc     %i0
2       std     %i2, [%l2+0]
3       inc     %i2
4   sbthrash_ins_count_60:
5       std     %i4, [%l4+24]
6       inc     %i4
7       add     2, %l1, %g1
8       lduha   [%g1] 0x20, %o1
9       add     48, %l4, %g4
10      ldda    [%g4] 0x20, %o4
11      stb     %i6, [%l6+45]
12      inc     %i6
13      st      %i2, [%l2+24]
14      inc     %i2
15  sbthrash_ins_count_70:
16      std     %i4, [%l4+56]
17      inc     %i4
18      std     %i4, [%l4+16]
19      inc     %i4
20      sth     %i0, [%l0+48]
21      inc     %i0
22      add     56, %l0, %g1
23      lda     [%g1] 0x20, %o0
24      sth     %i0, [%l0+14]
25      inc     %i0
26  sbthrash_ins_count_80:
27      std     %i6, [%l6+0]
28      inc     %i6
29      add     24, %l6, %g6
30      stda    %i6, [%g6] 0xB
31      inc     %i6
32      st      %i0, [%l0+60]
33      inc     %i0
34      sth     %i6, [%l6+62]
35      inc     %i6
36      add     0, %l1, %g1
37  sbthrash_ins_count_90:
38      stha    %i1, [%g1] 0x9
```

```
1       inc   %i1
2       add   56, %l4, %g4
3       stda  %i4, [%g4] 0x8
4       inc   %i4
5       st    %i3, [%l3+36]
6       inc   %i3
7       std   %i2, [%l2+0]
8       inc   %i2
9       sth   %i0, [%l0+54]
10  sbthrash_ins_count_100:
11      inc   %i0
12      ba    1f
13      nop
14  .align 0x800
15  .skip 0x7C0
16  1:
17      std   %i4, [%l4+48]
18      inc   %i4
19      std   %i4, [%l4+8]
20      inc   %i4
21      st    %i0, [%l0+8]
22      inc   %i0
23      add   44, %l6, %g6
24      sta   %i6, [%g6] 0x9
25  sbthrash_ins_count_110:
26      inc   %i6
27      std   %i4, [%l4+24]
28      inc   %i4
29      stb   %i4, [%l4+25]
30      inc   %i4
31      add   32, %l0, %g1
32      ldda  [%g1] 0x20, %o0
33      stb   %i2, [%l2+5]
34      inc   %i2
35      add   12, %l6, %g6
36  sbthrash_ins_count_120:
37      stha  %i6, [%g6] 0xB
38      inc   %i6
```

```
1       st      %i1, [%l1+44]
2       inc     %i1
3       ldd     [%l2+40], %o2
4       add     17, %l1, %g1
5       stba    %i1, [%g1] 0x9
6       inc     %i1
7       add     8, %l7, %g7
8       sta     %i7, [%g7] 0xB
9   sbthrash_ins_count_130:
10      inc     %i7
11      ldsb    [%l4+45], %o4
12      add     6, %l6, %g6
13      stba    %i6, [%g6] 0x8
14      inc     %i6
15      fmovs   %f0, %f1
16      st      %f1, [%l5+52]
17      fmovs   %f0, %f1
18      st      %f1, [%l6+8]
19      stb     %i2, [%l2+2]
20  sbthrash_ins_count_140:
21      inc     %i2
22      ba      1f
23      nop
24  .align 0x800
25  .skip 0x7C0
26  1:
27      st      %i2, [%l2+4]
28      inc     %i2
29      stb     %i7, [%l7+58]
30      inc     %i7
31      st      %i2, [%l2+56]
32      inc     %i2
33      add     16, %l2, %g2
34      stda    %i2, [%g2] 0x8
35  sbthrash_ins_count_150:
36      inc     %i2
37      stb     %i6, [%l6+2]
38      inc     %i6
```

```
1        ld    [%l2+20], %o2
2        add   16, %l3, %g3
3        sta   %i3, [%g3] 0xA
4        inc   %i3
5        st    %i4, [%l4+0]
6        inc   %i4
7        std   %i2, [%l2+16]
8   sbthrash_ins_count_160:
9        inc   %i2
10       ba    1f
11       nop
12  .align 0x800
13  .skip 0x7C0
14  1:
15       st    %i0, [%l0+12]
16       inc   %i0
17       add   39, %l7, %g7
18       stba  %i7, [%g7] 0x8
19       inc   %i7
20       add   24, %l5, %g5
21       sta   %i5, [%g5] 0xA
22       inc   %i5
23  sbthrash_ins_count_170:
24       ldsb  [%l1+7], %o1
25       ldub  [%l3+29], %o3
26       add   32, %l3, %g3
27       stha  %i3, [%g3] 0xB
28       inc   %i3
29       add   16, %l1, %g1
30       lda   [%g1] 0x20, %o1
31       std   %i2, [%l2+8]
32       inc   %i2
33       stb   %i0, [%l0+63]
34  sbthrash_ins_count_180:
35       inc   %i0
36       ba    1f
37       nop
38  .align 0x800
```

```
1    .skip 0x7C0
2    1:
3         st    %i5, [%l5+40]
4         inc   %i5
5         st    %i2, [%l2+48]
6         inc   %i2
7         sth   %i2, [%l2+4]
8         inc   %i2
9         add   56, %l2, %g2
10        stda  %i2, [%g2] 0xA
11   sbthrash_ins_count_190:
12        inc   %i2
13        add   28, %l4, %g4
14        stha  %i4, [%g4] 0x9
15        inc   %i4
16        stb   %i6, [%l6+47]
17        inc   %i6
18        stb   %i4, [%l4+10]
19        inc   %i4
20        std   %i2, [%l2+32]
21        inc   %i2
22   sbthrash_ins_count_200:
23        fmovs    %f0, %f1
24        st    %f1, [%l2+28]
25        stb   %i3, [%l3+16]
26        inc   %i3
27        st    %i0, [%l0+24]
28        inc   %i0
29        add   38, %l1, %g1
30        ldsba    [%g1] 0x20, %o1
31        stb   %i5, [%l5+19]
32        inc   %i5
33   sbthrash_ins_count_210:
34        add   33, %l2, %g2
35        stba  %i2, [%g2] 0xB
36        inc   %i2
37        mov   %i0, %o0
38        ldstub   [%l0+33], %o0
```

```
 1      inc    %i0
 2      std    %i0, [%l0+8]
 3      inc    %i0
 4      std    %i4, [%l4+48]
 5      inc    %i4
 6   sbthrash_ins_count_220:
 7      sth    %i7, [%l7+34]
 8      inc    %i7
 9      sth    %i2, [%l2+36]
10      inc    %i2
11      ld     [%l0+8], %o0
12      std    %i2, [%l2+32]
13      inc    %i2
14      stb    %i5, [%l5+57]
15      inc    %i5
16      stb    %i0, [%l0+25]
17   sbthrash_ins_count_230:
18      inc    %i0
19      stb    %i3, [%l3+12]
20      inc    %i3
21      std    %i2, [%l2+16]
22      inc    %i2
23      add    32, %l1, %g1
24      lduba  [%g1] 0x20, %o1
25      stb    %i6, [%l6+42]
26      inc    %i6
27      ldsb   [%l6+51], %o6
28   sbthrash_ins_count_240:
29      add    48, %l2, %g2
30      lda    [%g2] 0x20, %o2
31      std    %i0, [%l0+56]
32      inc    %i0
33      ld     [%l6+48], %f0
34      fmovs  %f0, %f1
35      sth    %i7, [%l7+30]
36      inc    %i7
37      ld     [%l3+40], %o3
38      st     %i0, [%l0+56]
```

*a)*

```
 1   sbthrash_ins_count_250:
 2         inc    %i0
 3         add    22, %l3, %g3
 4         ldsha      [%g3] 0x20, %o3
 5         add    7, %l7, %g7
 6         stba %i7, [%g7] 0xB
 7         inc    %i7
 8         std    %i6, [%l6+32]
 9         inc    %i6
10         sth    %i7, [%l7+32]
11         inc    %i7
12   sbthrash_ins_count_260:
13         mov    %i2, %o2
14         ldstub     [%l2+45], %o2
15         inc    %i2
16         sth    %i1, [%l1+4]
17         inc    %i1
18         sth    %i2, [%l2+50]
19         inc    %i2
20         st     %i2, [%l2+8]
21         inc    %i2
22         sth    %i2, [%l2+42]
23   sbthrash_ins_count_270:
24         inc    %i2
25         st     %i0, [%l0+4]
26         inc    %i0
27         ld     [%l5+40], %f0
28         fmovs      %f0, %f1
29         std    %i2, [%l2+8]
30         inc    %i2
31         add    20, %l0, %g1
32         stha %i0, [%g1] 0x8
33         inc    %i0
34   sbthrash_ins_count_280:
35         st     %i2, [%l2+32]
36         inc    %i2
37         stb    %i2, [%l2+48]
38         inc    %i2
```

```
1         add    56, %l2, %g2
2         sta    %i2, [%g2] 0x8
3         inc    %i2
4         fmovs  %f0, %f1
5         st     %f1, [%l2+40]
6         add    21, %l5, %g5
7  sbthrash_ins_count_290:
8         stba   %i5, [%g5] 0xB
9         inc    %i5
10        std    %i6, [%l6+48]
11        inc    %i6
12        sth    %i2, [%l2+2]
13        inc    %i2
14        ldub   [%l0+34], %o0
15        std    %i2, [%l2+0]
16        inc    %i2
17        sth    %i4, [%l4+34]
18 sbthrash_ins_count_300:
19        inc    %i4
20        ba     1f
21        nop
22 .align 0x800
23 .skip 0x7C0
24 1:
25        lduh   [%l7+12], %o7
26        ldd    [%l0+56], %o0
27        ld     [%l6+20], %f0
28        fmovs  %f0, %f1
29        sth    %i7, [%l7+4]
30        inc    %i7
31        ldsh   [%l6+42], %o6
32        sth    %i6, [%l6+52]
33 sbthrash_ins_count_310:
34        inc    %i6
35        std    %i2, [%l2+40]
36        inc    %i2
37        stb    %i7, [%l7+35]
38        inc    %i7
```

```
1       mov     %i0, %o0
2       ldstub  [%l0+12], %o0
3       inc     %i0
4       add     48, %l0, %g1
5       stda    %i0, [%g1] 0xB
6   sbthrash_ins_count_320:
7       inc     %i0
8       ba      1f
9       nop
10  .align 0x800
11  .skip 0x7C0
12  1:
13      stb     %i5, [%l5+11]
14      inc     %i5
15      stb     %i0, [%l0+45]
16      inc     %i0
17      add     32, %l2, %g2
18      stda    %i2, [%g2] 0x8
19      inc     %i2
20      add     16, %l6, %g6
21  sbthrash_ins_count_330:
22      stha    %i6, [%g6] 0x8
23      inc     %i6
24      add     28, %l3, %g3
25      sta     %i3, [%g3] 0xA
26      inc     %i3
27      sth     %i6, [%l6+42]
28      inc     %i6
29      ld      [%l1+60], %o1
30      add     37, %l3, %g3
31      lduba   [%g3] 0x20, %o3
32  sbthrash_ins_count_340:
33      stb     %i3, [%l3+22]
34      inc     %i3
35      ld      [%l4+8], %o4
36      add     58, %l3, %g3
37      stha    %i3, [%g3] 0xA
38      inc     %i3
```

```
1       st      %i5, [%15+52]
2       inc     %i5
3       add     56, %16, %g6
4       lda     [%g6] 0x20, %o6
5   sbthrash_ins_count_350:
6       stb     %i5, [%15+51]
7       inc     %i5
8       std     %i6, [%16+32]
9       inc     %i6
10      add     8, %12, %g2
11      stda    %i2, [%g2] 0xB
12      inc     %i2
13      stb     %i4, [%14+38]
14      inc     %i4
15      stb     %i1, [%11+37]
16  sbthrash_ins_count_360:
17      inc     %i1
18      ba      1f
19      nop
20      .align  0x800
21      .skip   0x7C0
22  1:
23      std     %i4, [%14+48]
24      inc     %i4
25      std     %i6, [%16+40]
26      inc     %i6
27      st      %i5, [%15+8]
28      inc     %i5
29      stb     %i3, [%13+63]
30      inc     %i3
31  sbthrash_ins_count_370:
32      std     %i6, [%16+32]
33      inc     %i6
34      st      %i4, [%14+28]
35      inc     %i4
36      add     4, %12, %g2
37      sta     %i2, [%g2] 0x8
38      inc     %i2
```

```
 1      sth    %i6, [%16+14]
 2      inc    %i6
 3      stb    %i2, [%12+19]
 4  sbthrash_ins_count_380:
 5      inc    %i2
 6      ba     1f
 7      nop
 8  .align 0x800
 9  .skip 0x7C0
10  1:
11      add    50, %15, %g5
12      stha   %i5, [%g5] 0x8
13      inc    %i5
14      sth    %i5, [%15+50]
15      inc    %i5
16      std    %i2, [%12+24]
17      inc    %i2
18      sth    %i6, [%16+40]
19  sbthrash_ins_count_390:
20      inc    %i6
21      sth    %i2, [%12+62]
22      inc    %i2
23      stb    %i3, [%13+13]
24      inc    %i3
25      sth    %i2, [%12+12]
26      inc    %i2
27      std    %i0, [%10+8]
28      inc    %i0
29      mov    %i6, %o6
30  sbthrash_ins_count_400:
31      ldstub [%16+44], %o6
32      inc    %i6
33      st     %i0, [%10+56]
34      inc    %i0
35      add    8, %12, %g2
36      lda    [%g2] 0x20, %o2
37      fmovs  %f0, %f1
38      st     %f1, [%10+16]
```

```
1           std     %i2, [%l2+8]
2           inc     %i2
3   sbthrash_ins_count_410:
4           ldsb    [%l6+21], %o6
5           add     12, %l4, %g4
6           stha    %i4, [%g4] 0x9
7           inc     %i4
8           st      %i0, [%l0+4]
9           inc     %i0
10          add     8, %l4, %g4
11          stda    %i4, [%g4] 0xB
12          inc     %i4
13          ld      [%l1+0], %o1
14  sbthrash_ins_count_420:
15          sth     %i7, [%l7+40]
16          inc     %i7
17          st      %i7, [%l7+28]
18          inc     %i7
19          st      %i6, [%l6+36]
20          inc     %i6
21          add     12, %l0, %g1
22          sta     %i0, [%g1] 0x9
23          inc     %i0
24          ld      [%l3+16], %o3
25  sbthrash_ins_count_430:
26          add     16, %l5, %g5
27          sta     %i5, [%g5] 0x9
28          inc     %i5
29          add     22, %l6, %g6
30          stba    %i6, [%g6] 0x8
31          inc     %i6
32          std     %i6, [%l6+8]
33          inc     %i6
34          lduh    [%l4+52], %o4
35          ld      [%l2+52], %o2
36  sbthrash_ins_count_440:
37          add     20, %l1, %g1
38          stha    %i1, [%g1] 0xB
```

```
1       inc     %i1
2       fmovs   %f0, %f1
3       st      %f1, [%12+4]
4       add     8, %14, %g4
5       ldda    [%g4] 0x20, %o4
6       std     %i6, [%16+8]
7       inc     %i6
8       stb     %i7, [%17+56]
9   sbthrash_ins_count_450:
10      inc     %i7
11      st      %i7, [%17+36]
12      inc     %i7
13      add     50, %14, %g4
14      stba    %i4, [%g4] 0x8
15      inc     %i4
16      st      %i2, [%12+52]
17      inc     %i2
18      add     52, %12, %g2
19      sta     %i2, [%g2] 0xB
20  sbthrash_ins_count_460:
21      inc     %i2
22      ba      1f
23      nop
24  .align 0x800
25  .skip 0x7C0
26  1:
27      add     62, %16, %g6
28      stha    %i6, [%g6] 0x9
29      inc     %i6
30      add     4, %13, %g3
31      sta     %i3, [%g3] 0x8
32      inc     %i3
33      add     32, %11, %g1
34      stha    %i1, [%g1] 0x8
35  sbthrash_ins_count_470:
36      inc     %i1
37      add     56, %16, %g6
38      stba    %i6, [%g6] 0xB
```

```
1       inc     %i6
2       add     18, %15, %g5
3       stba    %i5, [%g5] 0xA
4       inc     %i5
5       add     51, %12, %g2
6       stba    %i2, [%g2] 0xB
7       inc     %i2
8    sbthrash_ins_count_480:
9       add     7, %11, %g1
10      ldsba   [%g1] 0x20, %o1
11      stb     %i3, [%13+39]
12      inc     %i3
13      st      %i7, [%17+0]
14      inc     %i7
15      st      %i1, [%11+12]
16      inc     %i1
17      fmovs   %f0, %f1
18      st      %f1, [%16+52]
19   sbthrash_ins_count_490:
20      ldub    [%10+0], %o0
21      add     48, %10, %g1
22      stda    %i0, [%g1] 0xB
23      inc     %i0
24      st      %i6, [%16+20]
25      inc     %i6
26      add     36, %16, %g6
27      lda     [%g6] 0x20, %o6
28      st      %i1, [%11+4]
29      inc     %i1
30   sbthrash_ins_count_500:
31      stb     %i2, [%12+38]
32      inc     %i2
33      stb     %i3, [%13+57]
34      inc     %i3
35      ld      [%17+24], %o7
36      std     %i0, [%10+48]
37      inc     %i0
38      st      %i0, [%10+44]
```

```
1       inc     %i0
2       add     16, %l1, %g1
3    sbthrash_ins_count_510:
4       stha    %i1, [%g1] 0x9
5       inc     %i1
6       ldsh    [%l1+10], %o1
7       sth     %i2, [%l2+52]
8       inc     %i2
9       add     24, %l5, %g5
10      stba    %i5, [%g5] 0x9
11      inc     %i5
12      stb     %i7, [%l7+18]
13      inc     %i7
14   sbthrash_ins_count_520:
15      st      %i2, [%l2+44]
16      inc     %i2
17      ldd     [%l4+0], %o4
18      add     4, %l4, %g4
19      stha    %i4, [%g4] 0x9
20      inc     %i4
21      add     34, %l4, %g4
22      stha    %i4, [%g4] 0x8
23      inc     %i4
24      sth     %i6, [%l6+52]
25   sbthrash_ins_count_530:
26      inc     %i6
27      std     %i2, [%l2+0]
28      inc     %i2
29      std     %i6, [%l6+40]
30      inc     %i6
31      fmovs   %f0, %f1
32      st      %f1, [%l6+20]
33      ldd     [%l0+56], %o0
34      ldd     [%l4+56], %o4
35      add     9, %l2, %g2
36   sbthrash_ins_count_540:
37      stba    %i2, [%g2] 0xA
38      inc     %i2
```

```
1       ldsb    [%l2+4], %o2
2       stb     %i7, [%l7+35]
3       inc     %i7
4       add     8, %l1, %g1
5       sta     %i1, [%g1] 0xB
6       inc     %i1
7       mov     %i4, %o4
8       ldstub  [%l4+19], %o4
9   sbthrash_ins_count_550:
10      inc     %i4
11      stb     %i6, [%l6+26]
12      inc     %i6
13      st      %i1, [%l1+8]
14      inc     %i1
15      add     8, %l4, %g4
16      sta     %i4, [%g4] 0x8
17      inc     %i4
18      st      %i4, [%l4+44]
19      inc     %i4
20  sbthrash_ins_count_560:
21      stb     %i0, [%l0+50]
22      inc     %i0
23      ldsb    [%l5+15], %o5
24      add     16, %l6, %g6
25      stda    %i6, [%g6] 0xB
26      inc     %i6
27      add     44, %l3, %g3
28      stha    %i3, [%g3] 0x8
29      inc     %i3
30      add     40, %l4, %g4
31  sbthrash_ins_count_570:
32      sta     %i4, [%g4] 0xB
33      inc     %i4
34      add     8, %l6, %g6
35      stda    %i6, [%g6] 0x8
36      inc     %i6
37      stb     %i3, [%l3+28]
38      inc     %i3
```

```
1       std     %i4, [%l4+56]
2       inc     %i4
3       add     22, %l0, %g1
4   sbthrash_ins_count_580:
5       stba    %i0, [%g1] 0x9
6       inc     %i0
7       st      %i6, [%l6+16]
8       inc     %i6
9       fmovs   %f0, %f1
10      st      %f1, [%l2+16]
11      add     40, %l0, %g1
12      stba    %i0, [%g1] 0xA
13      inc     %i0
14      stb     %i0, [%l0+62]
15  sbthrash_ins_count_590:
16      inc     %i0
17      add     16, %l6, %g6
18      stda    %i6, [%g6] 0x9
19      inc     %i6
20      sth     %i4, [%l4+44]
21      inc     %i4
22      st      %i4, [%l4+32]
23      inc     %i4
24      sth     %i5, [%l5+8]
25      inc     %i5
26  sbthrash_ins_count_600:
27      stb     %i6, [%l6+50]
28      inc     %i6
29      st      %i3, [%l3+12]
30      inc     %i3
31      stb     %i4, [%l4+30]
32      inc     %i4
33      stb     %i7, [%l7+47]
34      inc     %i7
35      st      %i7, [%l7+8]
36      inc     %i7
37  sbthrash_ins_count_610:
38      add     39, %l6, %g6
```

```
1       stba    %i6, [%g6] 0x9
2       inc     %i6
3       add     51, %12, %g2
4       ldsba   [%g2] 0x20, %o2
5       st      %i6, [%16+44]
6       inc     %i6
7       st      %i7, [%17+48]
8       inc     %i7
9       ldd     [%16+0], %o6
10  sbthrash_ins_count_620:
11      std     %i4, [%14+0]
12      inc     %i4
13      stb     %i1, [%11+59]
14      inc     %i1
15      sth     %i2, [%12+16]
16      inc     %i2
17      lduh    [%10+54], %o0
18      add     46, %11, %g1
19      stha    %i1, [%g1] 0xA
20      inc     %i1
21  sbthrash_ins_count_630:
22      sth     %i0, [%10+32]
23      inc     %i0
24      sth     %i7, [%17+12]
25      inc     %i7
26      std     %i4, [%14+24]
27      inc     %i4
28      ldub    [%14+11], %o4
29      stb     %i6, [%16+24]
30      inc     %i6
31      std     %i0, [%10+48]
32  sbthrash_ins_count_640:
33      inc     %i0
34      ba      1f
35      nop
36  .align 0x800
37  .skip 0x7C0
38  1:
```

```
1        stb    %i2, [%12+6]
2        inc    %i2
3        add    46, %16, %g6
4        stba   %i6, [%g6] 0x8
5        inc    %i6
6        add    4, %16, %g6
7        sta    %i6, [%g6] 0xB
8        inc    %i6
9   sbthrash_ins_count_650:
10       fmovs   %f0, %f1
11       st     %f1, [%14+24]
12       sth    %i6, [%16+22]
13       inc    %i6
14       std    %i6, [%16+0]
15       inc    %i6
16       add    40, %12, %g2
17       stda   %i2, [%g2] 0x8
18       inc    %i2
19       std    %i2, [%12+0]
20  sbthrash_ins_count_660:
21       inc    %i2
22       ba     1f
23       nop
24  .align 0x800
25  .skip 0x7C0
26  1:
27       sth    %i2, [%12+38]
28       inc    %i2
29       add    54, %10, %g1
30       stba   %i0, [%g1] 0x8
31       inc    %i0
32       std    %i0, [%10+48]
33       inc    %i0
34       add    48, %14, %g4
35  sbthrash_ins_count_670:
36       stda   %i4, [%g4] 0xA
37       inc    %i4
38       ldsh   [%14+20], %o4
```

```
1       add    38, %l0, %g1
2       stba   %i0, [%g1] 0x8
3       inc    %i0
4       sth    %i4, [%l4+60]
5       inc    %i4
6       sth    %i3, [%l3+60]
7       inc    %i3
8    sbthrash_ins_count_680:
9       add    26, %l2, %g2
10      stha   %i2, [%g2] 0x8
11      inc    %i2
12      stb    %i2, [%l2+41]
13      inc    %i2
14      stb    %i2, [%l2+45]
15      inc    %i2
16      stb    %i0, [%l0+33]
17      inc    %i0
18      ldd    [%l6+48], %o6
19   sbthrash_ins_count_690:
20      add    40, %l3, %g3
21      ldsha  [%g3] 0x20, %o3
22      lduh   [%l3+50], %o3
23      add    38, %l6, %g6
24      stha   %i6, [%g6] 0xB
25      inc    %i6
26      add    16, %l4, %g4
27      stda   %i4, [%g4] 0xB
28      inc    %i4
29      std    %i2, [%l2+16]
30   sbthrash_ins_count_700:
31      inc    %i2
32      ba     1f
33      nop
34   .align 0x800
35   .skip 0x7C0
36   1:
37      st     %i5, [%l5+48]
38      inc    %i5
```

```
 1      st    %i1, [%l1+48]
 2      inc   %i1
 3      ldd   [%l6+24], %o6
 4      std   %i2, [%l2+8]
 5      inc   %i2
 6      st    %i1, [%l1+40]
 7  sbthrash_ins_count_710:
 8      inc   %i1
 9      add   32, %l0, %g1
10      ldda  [%g1] 0x20, %o0
11      ldd   [%l2+56], %o2
12      stb   %i7, [%l7+47]
13      inc   %i7
14      ld    [%l6+0], %f0
15      fmovs   %f0, %f1
16      mov   %i0, %o0
17      ldstub   [%l0+16], %o0
18  sbthrash_ins_count_720:
19      inc   %i0
20      ba    1f
21      nop
22  .align 0x800
23  .skip 0x7C0
24  1:
25      std   %i4, [%l4+48]
26      inc   %i4
27      std   %i0, [%l0+40]
28      inc   %i0
29      stb   %i3, [%l3+21]
30      inc   %i3
31      add   28, %l7, %g7
32      stha  %i7, [%g7] 0x8
33  sbthrash_ins_count_730:
34      inc   %i7
35      stb   %i1, [%l1+36]
36      inc   %i1
37      add   12, %l4, %g4
38      stba  %i4, [%g4] 0xA
```

```
1       inc   %i4
2       sth   %i4, [%14+16]
3       inc   %i4
4       add   56, %15, %g5
5       lduha    [%g5] 0x20, %o5
6    sbthrash_ins_count_740:
7       stb   %i4, [%14+51]
8       inc   %i4
9       std   %i0, [%10+8]
10      inc   %i0
11      std   %i0, [%10+48]
12      inc   %i0
13      ld    [%17+12], %o7
14      add   48, %12, %g2
15      stda  %i2, [%g2] 0x8
16      inc   %i2
17   sbthrash_ins_count_750:
18      ldsb  [%13+35], %o3
19      st    %i7, [%17+44]
20      inc   %i7
21      std   %i0, [%10+32]
22      inc   %i0
23      add   12, %16, %g6
24      sta   %i6, [%g6] 0x9
25      inc   %i6
26      stb   %i2, [%12+33]
27      inc   %i2
28   sbthrash_ins_count_760:
29      sth   %i6, [%16+14]
30      inc   %i6
31      sth   %i3, [%13+36]
32      inc   %i3
33      std   %i4, [%14+48]
34      inc   %i4
35      stb   %i4, [%14+1]
36      inc   %i4
37      stb   %i4, [%14+23]
38      inc   %i4
```

```
1   sbthrash_ins_count_770:
2           add    16, %14, %g4
3           ldda   [%g4] 0x20, %o4
4           std    %i6, [%16+8]
5           inc    %i6
6           ld     [%15+60], %o5
7           add    56, %16, %g6
8           lda    [%g6] 0x20, %o6
9           std    %i0, [%10+0]
10          inc    %i0
11          add    40, %14, %g4
12  sbthrash_ins_count_780:
13          ldda   [%g4] 0x20, %o4
14          ba     1f
15          nop
16  .align 0x800
17  .skip 0x7C0
18  1:
19          ld     [%14+56], %o4
20          stb    %i2, [%12+22]
21          inc    %i2
22          std    %i0, [%10+32]
23          inc    %i0
24          st     %i5, [%15+36]
25          inc    %i5
26          stb    %i5, [%15+44]
27  sbthrash_ins_count_790:
28          inc    %i5
29          add    2, %10, %g1
30          stha   %i0, [%g1] 0xA
31          inc    %i0
32          std    %i6, [%16+8]
33          inc    %i6
34          stb    %i1, [%11+56]
35          inc    %i1
36          add    16, %14, %g4
37          lda    [%g4] 0x20, %o4
38  sbthrash_ins_count_800:
```

```
1      sth    %i4, [%14+4]
2      inc    %i4
3      sth    %i5, [%15+44]
4      inc    %i5
5      sth    %i4, [%14+32]
6      inc    %i4
7      ldsb   [%14+58], %o4
8      std    %i4, [%14+56]
9      inc    %i4
10     ld     [%16+24], %f0
11  sbthrash_ins_count_810:
12     fmovs  %f0, %f1
13     add    30, %17, %g7
14     stha   %i7, [%g7] 0x9
15     inc    %i7
16     st     %i4, [%14+40]
17     inc    %i4
18     sth    %i6, [%16+0]
19     inc    %i6
20     std    %i6, [%16+40]
21     inc    %i6
22  sbthrash_ins_count_820:
23     std    %i6, [%16+8]
24     inc    %i6
25     add    12, %14, %g4
26     sta    %i4, [%g4] 0xA
27     inc    %i4
28     sth    %i1, [%11+16]
29     inc    %i1
30     add    60, %14, %g4
31     sta    %i4, [%g4] 0x8
32     inc    %i4
33  sbthrash_ins_count_830:
34     ld     [%10+16], %o0
35     ldsh   [%15+40], %o5
36     add    16, %11, %g1
37     sta    %i1, [%g1] 0xB
38     inc    %i1
```

```
 1      sth    %i0, [%l0+28]
 2      inc    %i0
 3      add    39, %l2, %g2
 4      stba   %i2, [%g2] 0x9
 5      inc    %i2
 6  sbthrash_ins_count_840:
 7      add    8, %l7, %g7
 8      stha   %i7, [%g7] 0xB
 9      inc    %i7
10      stb    %i1, [%l1+35]
11      inc    %i1
12      add    23, %l6, %g6
13      stba   %i6, [%g6] 0xA
14      inc    %i6
15      stb    %i4, [%l4+2]
16      inc    %i4
17  sbthrash_ins_count_850:
18      stb    %i3, [%l3+58]
19      inc    %i3
20      add    56, %l6, %g6
21      stda   %i6, [%g6] 0x8
22      inc    %i6
23      add    40, %l1, %g1
24      sta    %i1, [%g1] 0xB
25      inc    %i1
26      ldsh   [%l0+38], %o0
27      stb    %i7, [%l7+62]
28  sbthrash_ins_count_860:
29      inc    %i7
30      ba     1f
31      nop
32  .align 0x800
33  .skip  0x7C0
34  1:
35      sth    %i0, [%l0+52]
36      inc    %i0
37      ld     [%l1+28], %o1
38      std    %i2, [%l2+16]
```

```
1       inc    %i2
2       add    56, %14, %g4
3       sta    %i4, [%g4] 0xB
4       inc    %i4
5    sbthrash_ins_count_870:
6       stb    %i7, [%17+11]
7       inc    %i7
8       add    51, %17, %g7
9       stba   %i7, [%g7] 0x8
10      inc    %i7
11      std    %i0, [%10+48]
12      inc    %i0
13      stb    %i3, [%13+5]
14      inc    %i3
15      add    12, %15, %g5
16   sbthrash_ins_count_880:
17      sta    %i5, [%g5] 0x8
18      inc    %i5
19      lduh   [%10+18], %o0
20      add    44, %17, %g7
21      sta    %i7, [%g7] 0x9
22      inc    %i7
23      std    %i2, [%12+8]
24      inc    %i2
25      stb    %i6, [%16+63]
26      inc    %i6
27   sbthrash_ins_count_890:
28      sth    %i6, [%16+56]
29      inc    %i6
30      add    28, %17, %g7
31      stha   %i7, [%g7] 0x8
32      inc    %i7
33      st     %i7, [%17+16]
34      inc    %i7
35      ldub   [%12+54], %o2
36      std    %i0, [%10+40]
37      inc    %i0
38   sbthrash_ins_count_900:
```

```
1        std    %i4, [%l4+56]
2        inc    %i4
3        std    %i2, [%l2+0]
4        inc    %i2
5        add    10, %l0, %g1
6        stha   %i0, [%g1] 0x8
7        inc    %i0
8        ldub   [%l6+31], %o6
9        add    17, %l2, %g2
10       lduba     [%g2] 0x20, %o2
11   sbthrash_ins_count_910:
12       add    46, %l1, %g1
13       ldsha     [%g1] 0x20, %o1
14       stb    %i4, [%l4+55]
15       inc    %i4
16       stb    %i6, [%l6+20]
17       inc    %i6
18       st     %i5, [%l5+40]
19       inc    %i5
20       stb    %i3, [%l3+51]
21       inc    %i3
22   sbthrash_ins_count_920:
23       ld     [%l0+60], %o0
24       ba     1f
25       nop
26   .align 0x800
27   .skip 0x7C0
28   1:
29       stb    %i5, [%l5+15]
30       inc    %i5
31       sth    %i2, [%l2+48]
32       inc    %i2
33       ld     [%l0+48], %f0
34       fmovs     %f0, %f1
35       ld     [%l7+44], %f0
36       fmovs     %f0, %f1
37   sbthrash_ins_count_930:
38       ldsh   [%l5+4], %o5
```

```
1       std     %i4, [%14+40]
2       inc     %i4
3       st      %i6, [%16+56]
4       inc     %i6
5       sth     %i4, [%14+54]
6       inc     %i4
7       ldd     [%14+32], %o4
8       std     %i0, [%10+0]
9       inc     %i0
10  sbthrash_ins_count_940:
11      stb     %i1, [%11+4]
12      inc     %i1
13      add     52, %14, %g4
14      stba    %i4, [%g4] 0x9
15      inc     %i4
16      sth     %i1, [%11+46]
17      inc     %i1
18      std     %i4, [%14+16]
19      inc     %i4
20      add     52, %12, %g2
21  sbthrash_ins_count_950:
22      stha    %i2, [%g2] 0xA
23      inc     %i2
24      std     %i6, [%16+40]
25      inc     %i6
26      add     47, %13, %g3
27      stba    %i3, [%g3] 0xB
28      inc     %i3
29      stb     %i1, [%11+4]
30      inc     %i1
31      stb     %i1, [%11+31]
32  sbthrash_ins_count_960:
33      inc     %i1
34      ba      1f
35      nop
36  .align 0x800
37  .skip 0x7C0
38  1:
```

```
 1      stb   %i3, [%l3+27]
 2      inc   %i3
 3      std   %i4, [%l4+56]
 4      inc   %i4
 5      add   32, %l4, %g4
 6      stda  %i4, [%g4] 0x8
 7      inc   %i4
 8      add   38, %l3, %g3
 9   sbthrash_ins_count_970:
10      stha  %i3, [%g3] 0xA
11      inc   %i3
12      stb   %i3, [%l3+28]
13      inc   %i3
14      std   %i6, [%l6+56]
15      inc   %i6
16      add   16, %l4, %g4
17      stda  %i4, [%g4] 0xB
18      inc   %i4
19      add   18, %l7, %g7
20   sbthrash_ins_count_980:
21      stha  %i7, [%g7] 0x8
22      inc   %i7
23      ldsb  [%l5+12], %o5
24      ld    [%l2+60], %f0
25      fmovs %f0, %f1
26      add   4, %l2, %g2
27      sta   %i2, [%g2] 0xB
28      inc   %i2
29      add   8, %l4, %g4
30      stda  %i4, [%g4] 0xA
31   sbthrash_ins_count_990:
32      inc   %i4
33      st    %i7, [%l7+12]
34      inc   %i7
35      fmovs %f0, %f1
36      st    %f1, [%l4+56]
37      add   56, %l4, %g4
38      stda  %i4, [%g4] 0xA
```

```
1       inc   %i4
2       stb   %i6, [%l6+60]
3       inc   %i6
4   sbthrash_ins_count_1000:
5       add   61, %l1, %g1
6       stba  %i1, [%g1] 0x9
7       inc   %i1
8       std   %i0, [%l0+40]
9       inc   %i0
10      std   %i4, [%l4+48]
11      inc   %i4
12      st    %i5, [%l5+52]
13      inc   %i5
14      ldd   [%l4+8], %o4
15  sbthrash_ins_count_1010:
16      st    %i6, [%l6+56]
17      inc   %i6
18      st    %i6, [%l6+56]
19      inc   %i6
20      std   %i2, [%l2+56]
21      inc   %i2
22      add   41, %l7, %g7
23      stba  %i7, [%g7] 0x9
24      inc   %i7
25      st    %i2, [%l2+12]
26  sbthrash_ins_count_1020:
27      inc   %i2
28      ba    1f
29      nop
30  .align 0x800
31  .skip 0x7C0
32  1:
33      sth   %i4, [%l4+50]
34      inc   %i4
35      ldub  [%l6+17], %o6
36      ld    [%l6+56], %o6
37      sth   %i6, [%l6+56]
38      inc   %i6
```

```
1       mov    %i7, %o7
2       ldstub   [%l7+48], %o7
3  sbthrash_ins_count_1030:
4       inc    %i7
5       ld     [%l0+20], %f0
6       fmovs    %f0, %f1
7       add    52, %l3, %g3
8       stha %i3, [%g3] 0x8
9       inc    %i3
10      add    23, %l3, %g3
11      stba %i3, [%g3] 0x9
12      inc    %i3
13      add    61, %l5, %g5
14 sbthrash_ins_count_1040:
15      stba %i5, [%g5] 0xA
16      inc    %i5
17      ld     [%l7+16], %o7
18      stb    %i1, [%l1+16]
19      inc    %i1
20      stb    %i2, [%l2+18]
21      inc    %i2
22      std    %i6, [%l6+32]
23      inc    %i6
24      ldsb [%l6+29], %o6
25 sbthrash_ins_count_1050:
26      st     %i4, [%l4+12]
27      inc    %i4
28      fmovs    %f0, %f1
29      st     %f1, [%l1+44]
30      std    %i2, [%l2+32]
31      inc    %i2
32      stb    %i3, [%l3+28]
33      inc    %i3
34      lduh [%l5+36], %o5
35      fmovs    %f0, %f1
36 sbthrash_ins_count_1060:
37      st     %f1, [%l0+36]
38      ba     1f
```

```
1       nop
2   .align 0x800
3   .skip 0x7C0
4   1:
5       sth     %i2, [%l2+24]
6       inc     %i2
7       add     32, %l7, %g7
8       sta     %i7, [%g7] 0xA
9       inc     %i7
10      mov     %i0, %o0
11      ldstub  [%l0+13], %o0
12      inc     %i0
13  sbthrash_ins_count_1070:
14      sth     %i6, [%l6+16]
15      inc     %i6
16      add     22, %l4, %g4
17      stha    %i4, [%g4] 0x8
18      inc     %i4
19      ld      [%l7+20], %o7
20      ld      [%l4+8], %f0
21      fmovs   %f0, %f1
22      ldsb    [%l3+17], %o3
23      st      %i1, [%l1+20]
24  sbthrash_ins_count_1080:
25      inc     %i1
26      ba      1f
27      nop
28  .align 0x800
29  .skip 0x7C0
30  1:
31      stb     %i3, [%l3+51]
32      inc     %i3
33      fmovs   %f0, %f1
34      st      %f1, [%l5+28]
35      add     10, %l5, %g5
36      stba    %i5, [%g5] 0x8
37      inc     %i5
38      sth     %i1, [%l1+4]
```

```
 1   sbthrash_ins_count_1090:
 2           inc     %i1
 3           ldsh    [%l3+26], %o3
 4           ld      [%l3+0], %o3
 5           sth     %i0, [%l0+54]
 6           inc     %i0
 7           ldsb    [%l5+50], %o5
 8           std     %i6, [%l6+48]
 9           inc     %i6
10           add     12, %l3, %g3
11           sta     %i3, [%g3] 0x8
12  sbthrash_ins_count_1100:
13           inc     %i3
14           ba      1f
15           nop
16           .align 0x800
17           .skip 0x7C0
18  1:
19           sth     %i2, [%l2+46]
20           inc     %i2
21           st      %i6, [%l6+8]
22           inc     %i6
23           add     28, %l5, %g5
24           sta     %i5, [%g5] 0xA
25           inc     %i5
26           ld      [%l4+0], %o4
27  sbthrash_ins_count_1110:
28           add     44, %l4, %g4
29           stha    %i4, [%g4] 0x9
30           inc     %i4
31           st      %i3, [%l3+60]
32           inc     %i3
33           stb     %i0, [%l0+18]
34           inc     %i0
35           add     24, %l4, %g4
36           stda    %i4, [%g4] 0x8
37           inc     %i4
38  sbthrash_ins_count_1120:
```

```
 1        ld    [%17+32], %o7
 2        ba    1f
 3        nop
 4  .align 0x800
 5  .skip 0x7C0
 6  1:
 7        stb   %i3, [%13+46]
 8        inc   %i3
 9        stb   %i3, [%13+63]
10        inc   %i3
11        add   4, %17, %g7
12        sta   %i7, [%g7] 0xB
13        inc   %i7
14        ld    [%15+4], %o5
15  sbthrash_ins_count_1130:
16        ld    [%12+32], %f0
17        fmovs   %f0, %f1
18        add   20, %11, %g1
19        stha %i1, [%g1] 0x8
20        inc   %i1
21        std   %i4, [%14+24]
22        inc   %i4
23        add   57, %16, %g6
24        stba %i6, [%g6] 0x8
25        inc   %i6
26  sbthrash_ins_count_1140:
27        add   40, %10, %g1
28        stda %i0, [%g1] 0xB
29        inc   %i0
30        std   %i0, [%10+32]
31        inc   %i0
32        sth   %i1, [%11+10]
33        inc   %i1
34        add   4, %11, %g1
35        lda   [%g1] 0x20, %o1
36        add   23, %14, %g4
37  sbthrash_ins_count_1150:
38        stba %i4, [%g4] 0xB
```

```
1       inc     %i4
2       std     %i6, [%16+40]
3       inc     %i6
4       st      %i6, [%16+12]
5       inc     %i6
6       ldsh    [%15+28], %o5
7       sth     %i2, [%12+4]
8       inc     %i2
9       stb     %i2, [%12+17]
10  sbthrash_ins_count_1160:
11      inc     %i2
12      ba      1f
13      nop
14      .align 0x800
15      .skip 0x7C0
16  1:
17      mov     %i6, %o6
18      ldstub  [%16+18], %o6
19      inc     %i6
20      ldsh    [%17+54], %o7
21      add     9, %11, %g1
22      stba    %i1, [%g1] 0x8
23      inc     %i1
24      add     32, %11, %g1
25  sbthrash_ins_count_1170:
26      stha    %i1, [%g1] 0x9
27      inc     %i1
28      std     %i0, [%10+32]
29      inc     %i0
30      fmovs   %f0, %f1
31      st      %f1, [%17+16]
32      std     %i6, [%16+56]
33      inc     %i6
34      sth     %i5, [%15+40]
35      inc     %i5
36  sbthrash_ins_count_1180:
37      add     56, %12, %g2
38      stda    %i2, [%g2] 0x8
```

```
 1      inc    %i2
 2      add    56, %l2, %g2
 3      sta    %i2, [%g2] 0x8
 4      inc    %i2
 5      sth    %i5, [%l5+58]
 6      inc    %i5
 7      std    %i0, [%l0+24]
 8      inc    %i0
 9   sbthrash_ins_count_1190:
10      sth    %i1, [%l1+30]
11      inc    %i1
12      add    40, %l1, %g1
13      sta    %i1, [%g1] 0x8
14      inc    %i1
15      add    25, %l4, %g4
16      stba   %i4, [%g4] 0xA
17      inc    %i4
18      std    %i0, [%l0+32]
19      inc    %i0
20   sbthrash_ins_count_1200:
21      stb    %i6, [%l6+49]
22      inc    %i6
23      std    %i6, [%l6+56]
24      inc    %i6
25      fmovs  %f0, %f1
26      st     %f1, [%l1+60]
27      add    10, %l2, %g2
28      stba   %i2, [%g2] 0xB
29      inc    %i2
30      stb    %i4, [%l4+53]
31   sbthrash_ins_count_1210:
32      inc    %i4
33      stb    %i1, [%l1+41]
34      inc    %i1
35      ldd    [%l2+40], %o2
36      st     %i6, [%l6+0]
37      inc    %i6
38      st     %i2, [%l2+44]
```

```
1       inc    %i2
2       stb    %i7, [%17+6]
3       inc    %i7
4   sbthrash_ins_count_1220:
5       add    42, %15, %g5
6       stha   %i5, [%g5] 0x9
7       inc    %i5
8       ldsb   [%11+60], %o1
9       sth    %i4, [%14+34]
10      inc    %i4
11      add    48, %17, %g7
12      sta    %i7, [%g7] 0xB
13      inc    %i7
14      fmovs      %f0, %f1
15  sbthrash_ins_count_1230:
16      st     %f1, [%13+12]
17      stb    %i2, [%12+53]
18      inc    %i2
19      stb    %i7, [%17+39]
20      inc    %i7
21      add    22, %14, %g4
22      stha   %i4, [%g4] 0xB
23      inc    %i4
24      add    20, %14, %g4
25      sta    %i4, [%g4] 0x9
26  sbthrash_ins_count_1240:
27      inc    %i4
28      ba     1f
29      nop
30      .align 0x800
31      .skip 0x7C0
32  1:
33      add    14, %10, %g1
34      stba   %i0, [%g1] 0x9
35      inc    %i0
36      std    %i2, [%12+40]
37      inc    %i2
38      fmovs      %f0, %f1
```

```
1        st    %f1, [%12+20]
2        add   54, %16, %g6
3   sbthrash_ins_count_1250:
4        stha  %i6, [%g6] 0xA
5        inc   %i6
6        std   %i6, [%16+40]
7        inc   %i6
8        add   18, %14, %g4
9        stha  %i4, [%g4] 0xA
10       inc   %i4
11       add   48, %12, %g2
12       stda  %i2, [%g2] 0xA
13       inc   %i2
14  sbthrash_ins_count_1260:
15       std   %i6, [%16+0]
16       inc   %i6
17       st    %i5, [%15+48]
18       inc   %i5
19       st    %i4, [%14+28]
20       inc   %i4
21       add   24, %12, %g2
22       stda  %i2, [%g2] 0xA
23       inc   %i2
24       st    %i6, [%16+24]
25  sbthrash_ins_count_1270:
26       inc   %i6
27       add   8, %12, %g2
28       stda  %i2, [%g2] 0x8
29       inc   %i2
30       std   %i0, [%10+24]
31       inc   %i0
32       std   %i6, [%16+16]
33       inc   %i6
34       std   %i4, [%14+24]
35       inc   %i4
36  sbthrash_ins_count_1280:
37       stb   %i6, [%16+14]
38       inc   %i6
```

```
1       add   0, %l1, %g1
2       stba  %i1, [%g1] 0x8
3       inc   %i1
4       std   %i0, [%l0+0]
5       inc   %i0
6       st    %i4, [%l4+12]
7       inc   %i4
8       add   44, %l3, %g3
9  sbthrash_ins_count_1290:
10      lda   [%g3] 0x20, %o3
11      add   8, %l6, %g6
12      stda  %i6, [%g6] 0xB
13      inc   %i6
14      std   %i0, [%l0+56]
15      inc   %i0
16      add   40, %l4, %g4
17      stda  %i4, [%g4] 0x9
18      inc   %i4
19      fmovs    %f0, %f1
20 sbthrash_ins_count_1300:
21      st    %f1, [%l4+48]
22      ba    1f
23      nop
24 .align 0x800
25 .skip 0x7C0
26 1:
27      add   44, %l0, %g1
28      sta   %i0, [%g1] 0x8
29      inc   %i0
30      add   55, %l7, %g7
31      stba  %i7, [%g7] 0x8
32      inc   %i7
33      sth   %i6, [%l6+38]
34      inc   %i6
35 sbthrash_ins_count_1310:
36      std   %i6, [%l6+16]
37      inc   %i6
38      st    %i3, [%l3+12]
```

```
1        inc   %i3
2        add   56, %12, %g2
3        stda  %i2, [%g2] 0x8
4        inc   %i2
5        add   32, %10, %g1
6        stda  %i0, [%g1] 0xB
7        inc   %i0
8    sbthrash_ins_count_1320:
9        ldsh  [%16+56], %o6
10       ba    1f
11       nop
12   .align 0x800
13   .skip 0x7C0
14   1:
15       add   20, %15, %g5
16       sta   %i5, [%g5] 0xA
17       inc   %i5
18       sth   %i6, [%16+24]
19       inc   %i6
20       lduh  [%15+34], %o5
21       std   %i0, [%10+32]
22       inc   %i0
23   sbthrash_ins_count_1330:
24       sth   %i1, [%11+10]
25       inc   %i1
26       stb   %i4, [%14+37]
27       inc   %i4
28       st    %i7, [%17+24]
29       inc   %i7
30       std   %i6, [%16+32]
31       inc   %i6
32       add   2, %10, %g1
33       stba  %i0, [%g1] 0x8
34   sbthrash_ins_count_1340:
35       inc   %i0
36       ba    1f
37       nop
38   .align 0x800
```

```
1    .skip 0x7C0
2  1:
3          ldsb    [%l5+50], %o5
4          st      %i1, [%l1+52]
5          inc     %i1
6          ldd     [%l0+24], %o0
7          fmovs   %f0, %f1
8          st      %f1, [%l4+8]
9          st      %i6, [%l6+12]
10         inc     %i6
11 sbthrash_ins_count_1350:
12         fmovs   %f0, %f1
13         st      %f1, [%l6+40]
14         add     9, %l5, %g5
15         stba    %i5, [%g5] 0xA
16         inc     %i5
17         add     20, %l7, %g7
18         stha    %i7, [%g7] 0xB
19         inc     %i7
20         sth     %i3, [%l3+56]
21         inc     %i3
22 sbthrash_ins_count_1360:
23         add     52, %l1, %g1
24         sta     %i1, [%g1] 0xA
25         inc     %i1
26         stb     %i6, [%l6+35]
27         inc     %i6
28         sth     %i4, [%l4+52]
29         inc     %i4
30         st      %i5, [%l5+32]
31         inc     %i5
32         sth     %i2, [%l2+18]
33 sbthrash_ins_count_1370:
34         inc     %i2
35         stb     %i5, [%l5+32]
36         inc     %i5
37         mov     %i4, %o4
38         ldstub  [%l4+24], %o4
```

```
1       inc     %i4
2       st      %i1, [%l1+56]
3       inc     %i1
4       std     %i4, [%l4+48]
5       inc     %i4
6    sbthrash_ins_count_1380:
7       sth     %i0, [%l0+40]
8       inc     %i0
9       fmovs   %f0, %f1
10      st      %f1, [%l3+52]
11      ldd     [%l4+16], %o4
12      std     %i6, [%l6+32]
13      inc     %i6
14      add     10, %l0, %g1
15      stha    %i0, [%g1] 0x8
16      inc     %i0
17   sbthrash_ins_count_1390:
18      stb     %i2, [%l2+46]
19      inc     %i2
20      add     2, %l4, %g4
21      ldsha   [%g4] 0x20, %o4
22      stb     %i2, [%l2+50]
23      inc     %i2
24      sth     %i4, [%l4+56]
25      inc     %i4
26      add     40, %l0, %g1
27      ldsha   [%g1] 0x20, %o0
28   sbthrash_ins_count_1400:
29      add     8, %l0, %g1
30      stda    %i0, [%g1] 0xB
31      inc     %i0
32      add     32, %l2, %g2
33      stha    %i2, [%g2] 0x8
34      inc     %i2
35      add     42, %l0, %g1
36      stha    %i0, [%g1] 0x8
37      inc     %i0
38      std     %i6, [%l6+56]
```

```
 1    sbthrash_ins_count_1410:
 2         inc   %i6
 3         add   21, %l3, %g3
 4         stba  %i3, [%g3] 0x9
 5         inc   %i3
 6         sth   %i2, [%l2+4]
 7         inc   %i2
 8         stb   %i2, [%l2+7]
 9         inc   %i2
10         st    %i1, [%l1+32]
11         inc   %i1
12    sbthrash_ins_count_1420:
13         stb   %i1, [%l1+46]
14         inc   %i1
15         ldub  [%l0+17], %o0
16         add   56, %l0, %g1
17         stda  %i0, [%g1] 0xA
18         inc   %i0
19         add   36, %l5, %g5
20         sta   %i5, [%g5] 0x9
21         inc   %i5
22         std   %i0, [%l0+8]
23    sbthrash_ins_count_1430:
24         inc   %i0
25         stb   %i7, [%l7+27]
26         inc   %i7
27         stb   %i1, [%l1+28]
28         inc   %i1
29         add   40, %l6, %g6
30         stha  %i6, [%g6] 0x9
31         inc   %i6
32         sth   %i1, [%l1+46]
33         inc   %i1
34    sbthrash_ins_count_1440:
35         stb   %i6, [%l6+60]
36         inc   %i6
37         add   0, %l3, %g3
38         stha  %i3, [%g3] 0xA
```

```
1       inc     %i3
2       add     41, %l2, %g2
3       stba    %i2, [%g2] 0x9
4       inc     %i2
5       add     48, %l3, %g3
6       stba    %i3, [%g3] 0x8
7   sbthrash_ins_count_1450:
8       inc     %i3
9       ld      [%l4+40], %f0
10      fmovs   %f0, %f1
11      std     %i6, [%l6+32]
12      inc     %i6
13      stb     %i7, [%l7+6]
14      inc     %i7
15      ld      [%l3+8], %f0
16      fmovs   %f0, %f1
17      stb     %i6, [%l6+44]
18  sbthrash_ins_count_1460:
19      inc     %i6
20      ba      1f
21      nop
22      .align 0x800
23      .skip 0x7C0
24  1:
25      add     52, %l2, %g2
26      stba    %i2, [%g2] 0x8
27      inc     %i2
28      ldd     [%l6+8], %o6
29      sth     %i0, [%l0+30]
30      inc     %i0
31      ld      [%l6+44], %o6
32      ldsb    [%l7+53], %o7
33  sbthrash_ins_count_1470:
34      ldub    [%l1+42], %o1
35      add     14, %l0, %g1
36      stba    %i0, [%g1] 0x9
37      inc     %i0
38      st      %i0, [%l0+32]
```

```
1       inc     %i0
2       stb     %i7, [%l7+40]
3       inc     %i7
4       stb     %i3, [%l3+36]
5       inc     %i3
6    sbthrash_ins_count_1480:
7       add     32, %l2, %g2
8       stda    %i2, [%g2] 0x8
9       inc     %i2
10      stb     %i2, [%l2+48]
11      inc     %i2
12      std     %i4, [%l4+0]
13      inc     %i4
14      stb     %i3, [%l3+21]
15      inc     %i3
16      sth     %i2, [%l2+0]
17   sbthrash_ins_count_1490:
18      inc     %i2
19      std     %i4, [%l4+0]
20      inc     %i4
21      ld      [%l0+60], %o0
22      add     10, %l3, %g3
23      stba    %i3, [%g3] 0x8
24      inc     %i3
25      std     %i4, [%l4+24]
26      inc     %i4
27      fmovs   %f0, %f1
28   sbthrash_ins_count_1500:
29      st      %f1, [%l2+24]
30      ba      1f
31      nop
32   .align 0x800
33   .skip 0x7C0
34   1:
35      sth     %i1, [%l1+50]
36      inc     %i1
37      sth     %i5, [%l5+10]
38      inc     %i5
```

```
1       stb     %i0, [%l0+21]
2       inc     %i0
3       ld      [%l5+52], %o5
4       add     52, %l0, %g1
5    sbthrash_ins_count_1510:
6       ldsha   [%g1] 0x20, %o0
7       lduh    [%l3+6], %o3
8       ldsh    [%l1+30], %o1
9       sth     %i6, [%l6+22]
10      inc     %i6
11      sth     %i3, [%l3+12]
12      inc     %i3
13      add     40, %l4, %g4
14      stda    %i4, [%g4] 0x8
15      inc     %i4
16   sbthrash_ins_count_1520:
17      add     0, %l4, %g4
18      sta     %i4, [%g4] 0x8
19      inc     %i4
20      ld      [%l5+0], %o5
21      add     52, %l3, %g3
22      sta     %i3, [%g3] 0xA
23      inc     %i3
24      ldd     [%l4+32], %o4
25      add     48, %l3, %g3
26      stba    %i3, [%g3] 0x9
27   sbthrash_ins_count_1530:
28      inc     %i3
29      std     %i2, [%l2+40]
30      inc     %i2
31      add     13, %l6, %g6
32      stba    %i6, [%g6] 0x8
33      inc     %i6
34      stb     %i3, [%l3+63]
35      inc     %i3
36      add     12, %l2, %g2
37      sta     %i2, [%g2] 0xA
38   sbthrash_ins_count_1540:
```

```
1       inc     %i2
2       ba      1f
3       nop
4   .align 0x800
5   .skip 0x7C0
6   1:
7       ldub    [%l6+54], %o6
8       sth     %i6, [%l6+34]
9       inc     %i6
10      sth     %i4, [%l4+50]
11      inc     %i4
12      sth     %i0, [%l0+38]
13      inc     %i0
14      add     43, %l2, %g2
15  sbthrash_ins_count_1550:
16      stba    %i2, [%g2] 0x8
17      inc     %i2
18      add     4, %l0, %g1
19      sta     %i0, [%g1] 0x8
20      inc     %i0
21      st      %i2, [%l2+40]
22      inc     %i2
23      add     40, %l6, %g6
24      stda    %i6, [%g6] 0x9
25      inc     %i6
26  sbthrash_ins_count_1560:
27      sth     %i0, [%l0+4]
28      inc     %i0
29      add     48, %l5, %g5
30      lda     [%g5] 0x20, %o5
31      ldd     [%l2+0], %o2
32      stb     %i2, [%l2+29]
33      inc     %i2
34      stb     %i6, [%l6+37]
35      inc     %i6
36      stb     %i1, [%l1+19]
37  sbthrash_ins_count_1570:
38      inc     %i1
```

```
1         add    51, %l3, %g3
2         stba   %i3, [%g3] 0x8
3         inc    %i3
4         std    %i2, [%l2+24]
5         inc    %i2
6         st     %i1, [%l1+8]
7         inc    %i1
8         sth    %i6, [%l6+58]
9         inc    %i6
10  sbthrash_ins_count_1580:
11        ldub   [%l4+57], %o4
12        ba     1f
13        nop
14  .align 0x800
15  .skip 0x7C0
16  1:
17        std    %i6, [%l6+32]
18        inc    %i6
19        add    0, %l0, %g1
20        stda   %i0, [%g1] 0xB
21        inc    %i0
22        add    34, %l0, %g1
23        stba   %i0, [%g1] 0x9
24        inc    %i0
25  sbthrash_ins_count_1590:
26        sth    %i3, [%l3+34]
27        inc    %i3
28        sth    %i6, [%l6+8]
29        inc    %i6
30        std    %i2, [%l2+24]
31        inc    %i2
32        mov    %i0, %o0
33        ldstub [%l0+6], %o0
34        inc    %i0
35        sth    %i1, [%l1+58]
36  sbthrash_ins_count_1600:
37        inc    %i1
38        ba     1f
```

```
 1      nop
 2      .align 0x800
 3      .skip 0x7C0
 4   1:
 5      add    0, %l6, %g6
 6      stda   %i6, [%g6] 0x8
 7      inc    %i6
 8      add    18, %l7, %g7
 9      stha   %i7, [%g7] 0x9
10      inc    %i7
11      st     %i4, [%l4+56]
12      inc    %i4
13   sbthrash_ins_count_1610:
14      sth    %i0, [%l0+16]
15      inc    %i0
16      st     %i5, [%l5+8]
17      inc    %i5
18      add    29, %l2, %g2
19      stba   %i2, [%g2] 0xB
20      inc    %i2
21      add    0, %l4, %g4
22      stda   %i4, [%g4] 0xA
23      inc    %i4
24   sbthrash_ins_count_1620:
25      add    48, %l4, %g4
26      stda   %i4, [%g4] 0xB
27      inc    %i4
28      sth    %i5, [%l5+8]
29      inc    %i5
30      sth    %i5, [%l5+12]
31      inc    %i5
32      st     %i7, [%l7+24]
33      inc    %i7
34      add    52, %l4, %g4
35   sbthrash_ins_count_1630:
36      ldsba  [%g4] 0x20, %o4
37      add    16, %l5, %g5
38      sta    %i5, [%g5] 0xA
```

```
1       inc     %i5
2       sth     %i4, [%14+12]
3       inc     %i4
4       add     56, %l0, %g1
5       stda    %i0, [%g1] 0xA
6       inc     %i0
7       add     44, %l0, %g1
8   sbthrash_ins_count_1640:
9       lda     [%g1] 0x20, %o0
10      ba      1f
11      nop
12      .align  0x800
13      .skip   0x7C0
14  1:
15      sth     %i2, [%l2+50]
16      inc     %i2
17      add     15, %l1, %g1
18      ldsba   [%g1] 0x20, %o1
19      add     32, %l2, %g2
20      stda    %i2, [%g2] 0x9
21      inc     %i2
22      sth     %i6, [%l6+12]
23  sbthrash_ins_count_1650:
24      inc     %i6
25      ld      [%l2+24], %f0
26      fmovs   %f0, %f1
27      sth     %i1, [%l1+28]
28      inc     %i1
29      st      %i2, [%l2+4]
30      inc     %i2
31      sth     %i1, [%l1+56]
32      inc     %i1
33      add     35, %l3, %g3
34  sbthrash_ins_count_1660:
35      stba    %i3, [%g3] 0x8
36      inc     %i3
37      add     36, %l3, %g3
38      sta     %i3, [%g3] 0xA
```

```
1       inc   %i3
2       add   24, %l4, %g4
3       stda  %i4, [%g4] 0xB
4       inc   %i4
5       sth   %i1, [%l1+44]
6       inc   %i1
7  sbthrash_ins_count_1670:
8       fmovs    %f0, %f1
9       st    %f1, [%l6+0]
10      add   36, %l5, %g5
11      stba  %i5, [%g5] 0x8
12      inc   %i5
13      std   %i2, [%l2+40]
14      inc   %i2
15      sth   %i4, [%l4+4]
16      inc   %i4
17      sth   %i4, [%l4+54]
18  sbthrash_ins_count_1680:
19      inc   %i4
20      ba    1f
21      nop
22  .align 0x800
23  .skip 0x7C0
24  1:
25      st    %i7, [%l7+32]
26      inc   %i7
27      add   20, %l5, %g5
28      sta   %i5, [%g5] 0xA
29      inc   %i5
30      add   1, %l1, %g1
31      stba  %i1, [%g1] 0x8
32      inc   %i1
33  sbthrash_ins_count_1690:
34      st    %i2, [%l2+60]
35      inc   %i2
36      sth   %i2, [%l2+26]
37      inc   %i2
38      std   %i6, [%l6+48]
```

```
 1        inc   %i6
 2        stb   %i7, [%l7+7]
 3        inc   %i7
 4        add   36, %l7, %g7
 5        sta   %i7, [%g7] 0x8
 6     sbthrash_ins_count_1700:
 7        inc   %i7
 8        ba    1f
 9        nop
10     .align 0x800
11     .skip 0x7C0
12     1:
13        st    %i5, [%l5+8]
14        inc   %i5
15        stb   %i3, [%l3+59]
16        inc   %i3
17        stb   %i4, [%l4+55]
18        inc   %i4
19        std   %i0, [%l0+24]
20        inc   %i0
21     sbthrash_ins_count_1710:
22        ldub  [%l3+56], %o3
23        std   %i4, [%l4+32]
24        inc   %i4
25        ldsh  [%l3+10], %o3
26        add   8, %l4, %g4
27        stha  %i4, [%g4] 0xB
28        inc   %i4
29        ldd   [%l6+8], %o6
30        st    %i1, [%l1+20]
31        inc   %i1
32     sbthrash_ins_count_1720:
33        add   32, %l6, %g6
34        stda  %i6, [%g6] 0xB
35        inc   %i6
36        ldub  [%l1+36], %o1
37        stb   %i4, [%l4+28]
38        inc   %i4
```

```
1        sth     %i7, [%l7+26]
2        inc     %i7
3        add     8, %l4, %g4
4        stha    %i4, [%g4] 0xB
5   sbthrash_ins_count_1730:
6        inc     %i4
7        add     0, %l6, %g6
8        ldda    [%g6] 0x20, %o6
9        add     56, %l4, %g4
10       stba    %i4, [%g4] 0x8
11       inc     %i4
12       add     52, %l5, %g5
13       sta     %i5, [%g5] 0x8
14       inc     %i5
15       add     4, %l5, %g5
16  sbthrash_ins_count_1740:
17       ldsha   [%g5] 0x20, %o5
18       ba      1f
19       nop
20  .align 0x800
21  .skip 0x7C0
22  1:
23       sth     %i1, [%l1+28]
24       inc     %i1
25       add     28, %l0, %g1
26       lda     [%g1] 0x20, %o0
27       st      %i2, [%l2+8]
28       inc     %i2
29       std     %i4, [%l4+16]
30       inc     %i4
31  sbthrash_ins_count_1750:
32       sth     %i0, [%l0+0]
33       inc     %i0
34       stb     %i7, [%l7+31]
35       inc     %i7
36       ld      [%l6+20], %f0
37       fmovs   %f0, %f1
38       std     %f2, [%l2+56]
```

```
1        inc    %i2
2        add    56, %l1, %g1
3        stha   %i1, [%g1] 0x8
4   sbthrash_ins_count_1760:
5        inc    %i1
6        ba     1f
7        nop
8   .align 0x800
9   .skip 0x7C0
10  1:
11       std    %i4, [%l4+8]
12       inc    %i4
13       add    7, %l1, %g1
14       stba   %i1, [%g1] 0x8
15       inc    %i1
16       stb    %i0, [%l0+31]
17       inc    %i0
18       add    20, %l1, %g1
19  sbthrash_ins_count_1770:
20       stha   %i1, [%g1] 0x8
21       inc    %i1
22       lduh   [%l4+2], %o4
23       add    22, %l4, %g4
24       stha   %i4, [%g4] 0x8
25       inc    %i4
26       stb    %i2, [%l2+45]
27       inc    %i2
28       add    58, %l0, %g1
29       stha   %i0, [%g1] 0xB
30  sbthrash_ins_count_1780:
31       inc    %i0
32       ba     1f
33       nop
34  .align 0x800
35  .skip 0x7C0
36  1:
37       ldub   [%l1+61], %o1
38       add    54, %l5, %g5
```

```
 1        lduha    [%g5] 0x20, %o5
 2        std  %i4, [%l4+0]
 3        inc  %i4
 4        add  5, %l0, %g1
 5        stba %i0, [%g1] 0xA
 6        inc  %i0
 7    sbthrash_ins_count_1790:
 8        stb  %i7, [%l7+14]
 9        inc  %i7
10        st   %i3, [%l3+36]
11        inc  %i3
12        stb  %i1, [%l1+42]
13        inc  %i1
14        stb  %i3, [%l3+43]
15        inc  %i3
16        std  %i2, [%l2+56]
17        inc  %i2
18    sbthrash_ins_count_1800:
19        add  50, %l5, %g5
20        lduha    [%g5] 0x20, %o5
21        std  %i2, [%l2+40]
22        inc  %i2
23        mov  %i6, %o6
24        ldstub   [%l6+56], %o6
25        inc  %i6
26        add  41, %l3, %g3
27        stba %i3, [%g3] 0x9
28        inc  %i3
29    sbthrash_ins_count_1810:
30        stb  %i7, [%l7+51]
31        inc  %i7
32        st   %i7, [%l7+20]
33        inc  %i7
34        add  0, %l2, %g2
35        stda %i2, [%g2] 0x9
36        inc  %i2
37        add  60, %l1, %g1
38        sta  %i1, [%g1] 0x8
```

```
1        inc    %i1
2   sbthrash_ins_count_1820:
3        sth    %i4, [%l4+42]
4        inc    %i4
5        fmovs  %f0, %f1
6        st     %f1, [%l3+8]
7        add    24, %l0, %g1
8        stda   %i0, [%g1] 0xB
9        inc    %i0
10       sth    %i2, [%l2+0]
11       inc    %i2
12       stb    %i5, [%l5+7]
13  sbthrash_ins_count_1830:
14       inc    %i5
15       sth    %i1, [%l1+20]
16       inc    %i1
17       ldsb   [%l6+9], %o6
18       stb    %i6, [%l6+14]
19       inc    %i6
20       sth    %i1, [%l1+52]
21       inc    %i1
22       sth    %i7, [%l7+30]
23       inc    %i7
24  sbthrash_ins_count_1840:
25       add    18, %l3, %g3
26       ldsha  [%g3] 0x20, %o3
27       add    8, %l6, %g6
28       ldda   [%g6] 0x20, %o6
29       add    12, %l1, %g1
30       sta    %i1, [%g1] 0x8
31       inc    %i1
32       add    8, %l2, %g2
33       stda   %i2, [%g2] 0x9
34       inc    %i2
35  sbthrash_ins_count_1850:
36       ldub   [%l7+10], %o7
37       add    3, %l7, %g7
38       stba   %i7, [%g7] 0x8
```

```
1       inc    %i7
2       add    16, %l7, %g7
3       lda    [%g7] 0x20, %o7
4       stb    %i7, [%l7+16]
5       inc    %i7
6       add    17, %l6, %g6
7       stba   %i6, [%g6] 0xA
8    sbthrash_ins_count_1860:
9       inc    %i6
10      ba     1f
11      nop
12   .align 0x800
13   .skip 0x7C0
14   1:
15      add    53, %l2, %g2
16      lduba  [%g2] 0x20, %o2
17      add    58, %l1, %g1
18      ldsba  [%g1] 0x20, %o1
19      stb    %i1, [%l1+60]
20      inc    %i1
21      stb    %i5, [%l5+53]
22      inc    %i5
23   sbthrash_ins_count_1870:
24      ld     [%l6+44], %o6
25      stb    %i3, [%l3+44]
26      inc    %i3
27      sth    %i3, [%l3+46]
28      inc    %i3
29      std    %i0, [%l0+16]
30      inc    %i0
31      add    32, %l2, %g2
32      stha   %i2, [%g2] 0xB
33      inc    %i2
34   sbthrash_ins_count_1880:
35      stb    %i3, [%l3+3]
36      inc    %i3
37      st     %i5, [%l5+28]
38      inc    %i5
```

```
1       stb     %i4, [%14+29]
2       inc     %i4
3       add     44, %17, %g7
4       stha    %i7, [%g7] 0x8
5       inc     %i7
6       add     36, %10, %g1
7    sbthrash_ins_count_1890:
8       lda     [%g1] 0x20, %o0
9       add     56, %14, %g4
10      stda    %i4, [%g4] 0xB
11      inc     %i4
12      st      %i2, [%12+44]
13      inc     %i2
14      st      %i6, [%16+44]
15      inc     %i6
16      lduh    [%16+14], %o6
17      ld      [%10+56], %o0
18   sbthrash_ins_count_1900:
19      st      %i4, [%14+60]
20      inc     %i4
21      std     %i6, [%16+0]
22      inc     %i6
23      stb     %i0, [%10+22]
24      inc     %i0
25      stb     %i7, [%17+16]
26      inc     %i7
27      st      %i5, [%15+16]
28      inc     %i5
29   sbthrash_ins_count_1910:
30      add     32, %11, %g1
31      lda     [%g1] 0x20, %o1
32      ldd     [%12+24], %o2
33      st      %i4, [%14+28]
34      inc     %i4
35      add     36, %10, %g1
36      sta     %i0, [%g1] 0xB
37      inc     %i0
38      ldsh    [%12+46], %o2
```

```
1       st      %i4, [%14+44]
2   sbthrash_ins_count_1920:
3       inc     %i4
4       ba      1f
5       nop
6   .align 0x800
7   .skip 0x7C0
8   1:
9       st      %i6, [%16+56]
10      inc     %i6
11      add     36, %14, %g4
12      sta     %i4, [%g4] 0xA
13      inc     %i4
14      std     %i4, [%14+32]
15      inc     %i4
16      std     %i6, [%16+48]
17  sbthrash_ins_count_1930:
18      inc     %i6
19      ldd     [%10+24], %o0
20      st      %i3, [%13+20]
21      inc     %i3
22      add     33, %12, %g2
23      stba    %i2, [%g2] 0x9
24      inc     %i2
25      ld      [%15+4], %f0
26      fmovs   %f0, %f1
27      add     44, %15, %g5
28  sbthrash_ins_count_1940:
29      stha    %i5, [%g5] 0xB
30      inc     %i5
31      st      %i5, [%15+0]
32      inc     %i5
33      sth     %i0, [%10+10]
34      inc     %i0
35      ldsb    [%12+12], %o2
36      st      %i1, [%11+28]
37      inc     %i1
38      add     56, %17, %g7
```

```
1    sbthrash_ins_count_1950:
2         sta   %i7, [%g7] 0xB
3         inc   %i7
4         add   48, %l2, %g2
5         sta   %i2, [%g2] 0xB
6         inc   %i2
7         ld    [%l5+24], %o5
8         add   38, %l1, %g1
9         stha  %i1, [%g1] 0x9
10        inc   %i1
11        sth   %i0, [%l0+34]
12   sbthrash_ins_count_1960:
13        inc   %i0
14        ba    1f
15        nop
16   .align 0x800
17   .skip 0x7C0
18   1:
19        add   32, %l2, %g2
20        stda  %i2, [%g2] 0x8
21        inc   %i2
22        stb   %i2, [%l2+31]
23        inc   %i2
24        add   32, %l5, %g5
25        stba  %i5, [%g5] 0x9
26        inc   %i5
27   sbthrash_ins_count_1970:
28        add   44, %l3, %g3
29        lda   [%g3] 0x20, %o3
30        add   54, %l2, %g2
31        stba  %i2, [%g2] 0xB
32        inc   %i2
33        ldub  [%l4+49], %o4
34        stb   %i0, [%l0+62]
35        inc   %i0
36        add   24, %l2, %g2
37        stda  %i2, [%g2] 0xA
38   sbthrash_ins_count_1980:
```

```
1       inc     %i2
2       ba      1f
3       nop
4       .align 0x800
5       .skip 0x7C0
6    1:
7       add     14, %l7, %g7
8       stba    %i7, [%g7] 0xB
9       inc     %i7
10      std     %i4, [%l4+24]
11      inc     %i4
12      sth     %i4, [%l4+62]
13      inc     %i4
14      sth     %i1, [%l1+60]
15   sbthrash_ins_count_1990:
16      inc     %i1
17      add     4, %l1, %g1
18      sta     %i1, [%g1] 0xA
19      inc     %i1
20      stb     %i2, [%l2+55]
21      inc     %i2
22      stb     %i5, [%l5+33]
23      inc     %i5
24      sth     %i6, [%l6+46]
25      inc     %i6
26   sbthrash_ins_count_2000:
27      add     44, %l2, %g2
28      stba    %i2, [%g2] 0xA
29      inc     %i2
30      std     %i6, [%l6+56]
31      inc     %i6
32      stb     %i1, [%l1+4]
33      inc     %i1
34      sth     %i4, [%l4+14]
35      inc     %i4
36      ld      [%l4+0], %f0
37   sbthrash_ins_count_2010:
38      fmovs   %f0, %f1
```

```
1       fmovs   %f0, %f1
2       st      %f1, [%l6+48]
3       std     %i0, [%l0+8]
4       inc     %i0
5       fmovs   %f0, %f1
6       st      %f1, [%l4+12]
7       add     62, %l0, %g1
8       stha    %i0, [%g1] 0x9
9       inc     %i0
10  sbthrash_ins_count_2020:
11      sth     %i2, [%l2+46]
12      inc     %i2
13      add     6, %l3, %g3
14      stha    %i3, [%g3] 0xA
15      inc     %i3
16      stb     %i3, [%l3+50]
17      inc     %i3
18      stb     %i0, [%l0+6]
19      inc     %i0
20      st      %i5, [%l5+44]
21  sbthrash_ins_count_2030:
22      inc     %i5
23      add     20, %l3, %g3
24      sta     %i3, [%g3] 0x8
25      inc     %i3
26      ld      [%l2+44], %f0
27      fmovs   %f0, %f1
28      add     8, %l6, %g6
29      stda    %i6, [%g6] 0x9
30      inc     %i6
31      st      %i0, [%l0+52]
32  sbthrash_ins_count_2040:
33      inc     %i0
34      ba      1f
35      nop
36  .align 0x800
37  .skip 0x7C0
38  1:
```

```
1       add     24, %l6, %g6
2       lda     [%g6] 0x20, %o6
3       stb     %i1, [%l1+4]
4       inc     %i1
5       ldd     [%l4+32], %o4
6       std     %i6, [%l6+24]
7       inc     %i6
8       add     24, %l4, %g4
9    sbthrash_ins_count_2050:
10      ldda    [%g4] 0x20, %o4
11      add     48, %l4, %g4
12      stda    %i4, [%g4] 0xB
13      inc     %i4
14      st      %i4, [%l4+48]
15      inc     %i4
16      sth     %i0, [%l0+28]
17      inc     %i0
18      sth     %i5, [%l5+50]
19      inc     %i5
20   sbthrash_ins_count_2060:
21      mov     %i5, %o5
22      ldstub  [%l5+59], %o5
23      inc     %i5
24      add     20, %l3, %g3
25      sta     %i3, [%g3] 0xA
26      inc     %i3
27      st      %i2, [%l2+20]
28      inc     %i2
29      add     40, %l3, %g3
30      lda     [%g3] 0x20, %o3
31   sbthrash_ins_count_2070:
32      std     %i4, [%l4+0]
33      inc     %i4
34      st      %i1, [%l1+12]
35      inc     %i1
36      st      %i4, [%l4+44]
37      inc     %i4
38      stb     %i1, [%l1+15]
```

```
1        inc   %i1
2        std   %i4, [%l4+16]
3        inc   %i4
4   sbthrash_ins_count_2080:
5        stb   %i3, [%l3+33]
6        inc   %i3
7        add   24, %l2, %g2
8        stda  %i2, [%g2] 0xA
9        inc   %i2
10       sth   %i1, [%l1+32]
11       inc   %i1
12       ld    [%l3+28], %o3
13       sth   %i5, [%l5+12]
14       inc   %i5
15  sbthrash_ins_count_2090:
16       ld    [%l5+40], %o5
17       std   %i6, [%l6+16]
18       inc   %i6
19       sth   %i5, [%l5+18]
20       inc   %i5
21       sth   %i2, [%l2+24]
22       inc   %i2
23       lduh  [%l2+38], %o2
24       sth   %i1, [%l1+0]
25       inc   %i1
26  sbthrash_ins_count_2100:
27       add   39, %l1, %g1
28       stba  %i1, [%g1] 0xA
29       inc   %i1
30       add   29, %l2, %g2
31       ldsba [%g2] 0x20, %o2
32       std   %i6, [%l6+24]
33       inc   %i6
34       stb   %i2, [%l2+44]
35       inc   %i2
36       ldsb  [%l7+4], %o7
37  sbthrash_ins_count_2110:
38       st    %i6, [%l6+52]
```

```
1       inc   %i6
2       stb   %i6, [%l6+10]
3       inc   %i6
4       std   %i2, [%l2+56]
5       inc   %i2
6       add   38, %l2, %g2
7       stha  %i2, [%g2] 0xB
8       inc   %i2
9       sth   %i7, [%l7+38]
10  sbthrash_ins_count_2120:
11      inc   %i7
12      ba    1f
13      nop
14  .align 0x800
15  .skip 0x7C0
16  1:
17      sth   %i0, [%l0+44]
18      inc   %i0
19      add   32, %l7, %g7
20      sta   %i7, [%g7] 0x8
21      inc   %i7
22      add   56, %l2, %g2
23      stda  %i2, [%g2] 0x8
24      inc   %i2
25  sbthrash_ins_count_2130:
26      add   2, %l3, %g3
27      stba  %i3, [%g3] 0xA
28      inc   %i3
29      sth   %i2, [%l2+12]
30      inc   %i2
31      fmovs    %f0, %f1
32      st    %f1, [%l7+60]
33      ld    [%l4+16], %o4
34      add   56, %l6, %g6
35      stda  %i6, [%g6] 0xB
36  sbthrash_ins_count_2140:
37      inc   %i6
38      ba    1f
```

```
1       nop
2   .align 0x800
3   .skip 0x7C0
4   1:
5       std     %i0, [%l0+8]
6       inc     %i0
7       sth     %i2, [%l2+36]
8       inc     %i2
9       ldsb    [%l2+29], %o2
10      fmovs   %f0, %f1
11      st      %f1, [%l3+44]
12      std     %i2, [%l2+0]
13  sbthrash_ins_count_2150:
14      inc     %i2
15      add     60, %l5, %g5
16      sta     %i5, [%g5] 0x9
17      inc     %i5
18      std     %i0, [%l0+56]
19      inc     %i0
20      sth     %i0, [%l0+48]
21      inc     %i0
22      mov     %i4, %o4
23      ldstub  [%l4+15], %o4
24  sbthrash_ins_count_2160:
25      inc     %i4
26      ba      1f
27      nop
28  .align 0x800
29  .skip 0x7C0
30  1:
31      add     12, %l6, %g6
32      stha    %i6, [%g6] 0xB
33      inc     %i6
34      std     %i2, [%l2+8]
35      inc     %i2
36      add     48, %l6, %g6
37      stda    %i6, [%g6] 0x8
38      inc     %i6
```

```
sbthrash_ins_count_2170:
        st      %i7, [%l7+12]
        inc     %i7
        ldd     [%l2+48], %o2
        add     19, %l0, %g1
        stba    %i0, [%g1] 0xA
        inc     %i0
        sth     %i7, [%l7+42]
        inc     %i7
        ld      [%l5+28], %f0
        fmovs   %f0, %f1
sbthrash_ins_count_2180:
        stb     %i0, [%l0+24]
        inc     %i0
        ldub    [%l5+31], %o5
        ld      [%l4+40], %f0
        fmovs   %f0, %f1
        add     18, %l3, %g3
        stba    %i3, [%g3] 0x9
        inc     %i3
        st      %i0, [%l0+4]
        inc     %i0
sbthrash_ins_count_2190:
        st      %i3, [%l3+16]
        inc     %i3
        st      %i4, [%l4+0]
        inc     %i4
        stb     %i7, [%l7+42]
        inc     %i7
        add     12, %l5, %g5
        lda     [%g5] 0x20, %o5
        add     0, %l7, %g7
        sta     %i7, [%g7] 0xB
sbthrash_ins_count_2200:
        inc     %i7
        ba      1f
        nop
        .align 0x800
```

```
1       .skip 0x7C0
2       1:
3               sth     %i2, [%l2+54]
4               inc     %i2
5               lduh    [%l4+10], %o4
6               stb     %i3, [%l3+20]
7               inc     %i3
8               sth     %i1, [%l1+50]
9               inc     %i1
10              stb     %i4, [%l4+24]
11      sbthrash_ins_count_2210:
12              inc     %i4
13              add     58, %l5, %g5
14              stha    %i5, [%g5] 0xA
15              inc     %i5
16              ld      [%l3+16], %o3
17              std     %i0, [%l0+0]
18              inc     %i0
19              lduh    [%l1+0], %o1
20              sth     %i0, [%l0+14]
21              inc     %i0
22      sbthrash_ins_count_2220:
23              st      %i1, [%l1+60]
24              inc     %i1
25              fmovs   %f0, %f1
26              st      %f1, [%l1+48]
27              std     %i4, [%l4+24]
28              inc     %i4
29              ldub    [%l7+12], %o7
30              sth     %i4, [%l4+60]
31              inc     %i4
32              std     %i2, [%l2+16]
33      sbthrash_ins_count_2230:
34              inc     %i2
35              ld      [%l7+28], %o7
36              lduh    [%l7+46], %o7
37              add     40, %l2, %g2
38              stda    %i2, [%g2] 0xB
```

```
1       inc     %i2
2       stb     %i6, [%l6+7]
3       inc     %i6
4       add     12, %l5, %g5
5       sta     %i5, [%g5] 0xA
6   sbthrash_ins_count_2240:
7       inc     %i5
8       ba      1f
9       nop
10  .align 0x800
11  .skip 0x7C0
12  1:
13      stb     %i3, [%l3+2]
14      inc     %i3
15      stb     %i3, [%l3+39]
16      inc     %i3
17      add     52, %l1, %g1
18      sta     %i1, [%g1] 0xA
19      inc     %i1
20      ldub    [%l6+20], %o6
21  sbthrash_ins_count_2250:
22      add     44, %l3, %g3
23      sta     %i3, [%g3] 0xA
24      inc     %i3
25      lduh    [%l4+4], %o4
26      ld      [%l2+20], %o2
27      add     24, %l2, %g2
28      stda    %i2, [%g2] 0xA
29      inc     %i2
30      add     16, %l0, %g1
31      stda    %i0, [%g1] 0xB
32  sbthrash_ins_count_2260:
33      inc     %i0
34      ba      1f
35      nop
36  .align 0x800
37  .skip 0x7C0
38  1:
```

```
 1         stb    %i1, [%l1+23]
 2         inc    %i1
 3         sth    %i5, [%l5+14]
 4         inc    %i5
 5         add    29, %l5, %g5
 6         stba   %i5, [%g5] 0x8
 7         inc    %i5
 8         ld     [%l5+44], %f0
 9  sbthrash_ins_count_2270:
10         fmovs  %f0, %f1
11         std    %i6, [%l6+0]
12         inc    %i6
13         add    53, %l1, %g1
14         stba   %i1, [%g1] 0x8
15         inc    %i1
16         st     %i2, [%l2+36]
17         inc    %i2
18         add    20, %l1, %g1
19         lduha  [%g1] 0x20, %o1
20  sbthrash_ins_count_2280:
21         ldd    [%l0+56], %o0
22         ba     1f
23         nop
24         .align 0x800
25         .skip  0x7C0
26  1:
27         std    %i2, [%l2+32]
28         inc    %i2
29         st     %i1, [%l1+36]
30         inc    %i1
31         st     %i2, [%l2+56]
32         inc    %i2
33         st     %i5, [%l5+24]
34         inc    %i5
35  sbthrash_ins_count_2290:
36         ld     [%l6+0], %o6
37         ldd    [%l2+0], %o2
38         stb    %i1, [%l1+23]
```

```
1       inc     %i1
2       add     24, %l0, %g1
3       ldsha   [%g1] 0x20, %o0
4       add     34, %l1, %g1
5       stha    %i1, [%g1] 0x9
6       inc     %i1
7       st      %i0, [%l0+4]
8    sbthrash_ins_count_2300:
9       inc     %i0
10      ba      1f
11      nop
12   .align 0x800
13   .skip 0x7C0
14   1:
15      add     2, %l3, %g3
16      stha    %i3, [%g3] 0x9
17      inc     %i3
18      mov     %i7, %o7
19      ldstub  [%l7+42], %o7
20      inc     %i7
21      ldsb    [%l5+18], %o5
22      ldsh    [%l6+4], %o6
23   sbthrash_ins_count_2310:
24      st      %i2, [%l2+16]
25      inc     %i2
26      std     %i6, [%l6+8]
27      inc     %i6
28      add     24, %l5, %g5
29      stha    %i5, [%g5] 0xB
30      inc     %i5
31      add     0, %l6, %g6
32      stha    %i6, [%g6] 0xA
33      inc     %i6
34   sbthrash_ins_count_2320:
35      stb     %i2, [%l2+14]
36      inc     %i2
37      std     %i6, [%l6+40]
38      inc     %i6
```

```
1       stb     %i1, [%l1+25]
2       inc     %i1
3       fmovs   %f0, %f1
4       st      %f1, [%l2+32]
5       add     6, %l1, %g1
6       ldsba   [%g1] 0x20, %o1
7   sbthrash_ins_count_2330:
8       sth     %i6, [%l6+40]
9       inc     %i6
10      add     56, %l0, %g1
11      stda    %i0, [%g1] 0xA
12      inc     %i0
13      ldsb    [%l6+50], %o6
14      stb     %i4, [%l4+44]
15      inc     %i4
16      stb     %i2, [%l2+51]
17      inc     %i2
18  sbthrash_ins_count_2340:
19      std     %i0, [%l0+24]
20      inc     %i0
21      st      %i5, [%l5+0]
22      inc     %i5
23      stb     %i3, [%l3+46]
24      inc     %i3
25      std     %i4, [%l4+0]
26      inc     %i4
27      add     38, %l6, %g6
28      stba    %i6, [%g6] 0xA
29  sbthrash_ins_count_2350:
30      inc     %i6
31      std     %i6, [%l6+40]
32      inc     %i6
33      add     26, %l1, %g1
34      stha    %i1, [%g1] 0x9
35      inc     %i1
36      st      %i4, [%l4+40]
37      inc     %i4
38      add     44, %l0, %g1
```

```
1         lda    [%g1] 0x20, %o0
2    sbthrash_ins_count_2360:
3         ldsh   [%l2+48], %o2
4         ba     1f
5         nop
6    .align 0x800
7    .skip 0x7C0
8    1:
9         stb    %i5, [%l5+3]
10        inc    %i5
11        add    18, %l1, %g1
12        stba   %i1, [%g1] 0x8
13        inc    %i1
14        ldd    [%l2+48], %o2
15        fmovs  %f0, %f1
16        st     %f1, [%l0+4]
17   sbthrash_ins_count_2370:
18        add    60, %l0, %g1
19        stha   %i0, [%g1] 0x9
20        inc    %i0
21        add    9, %l0, %g1
22        stba   %i0, [%g1] 0x9
23        inc    %i0
24        add    8, %l7, %g7
25        sta    %i7, [%g7] 0x8
26        inc    %i7
27        add    15, %l2, %g2
28   sbthrash_ins_count_2380:
29        stba   %i2, [%g2] 0x9
30        inc    %i2
31        add    16, %l6, %g6
32        ldda   [%g6] 0x20, %o6
33        std    %i4, [%l4+32]
34        inc    %i4
35        sth    %i0, [%l0+16]
36        inc    %i0
37        std    %i0, [%l0+32]
38        inc    %i0
```

```
1   sbthrash_ins_count_2390:
2       add    16, %l2, %g2
3       stda   %i2, [%g2] 0xA
4       inc    %i2
5       sth    %i1, [%l1+40]
6       inc    %i1
7       std    %i4, [%l4+0]
8       inc    %i4
9       add    24, %l4, %g4
10      stda   %i4, [%g4] 0xB
11      inc    %i4
12  sbthrash_ins_count_2400:
13      add    16, %l6, %g6
14      stda   %i6, [%g6] 0xB
15      inc    %i6
16      ld     [%l5+60], %o5
17      stb    %i2, [%l2+11]
18      inc    %i2
19      ldd    [%l2+56], %o2
20      std    %i6, [%l6+48]
21      inc    %i6
22      add    32, %l2, %g2
23  sbthrash_ins_count_2410:
24      stda   %i2, [%g2] 0xB
25      inc    %i2
26      st     %i0, [%l0+0]
27      inc    %i0
28      stb    %i2, [%l2+33]
29      inc    %i2
30      fmovs  %f0, %f1
31      st     %f1, [%l7+36]
32      add    36, %l7, %g7
33      sta    %i7, [%g7] 0x9
34  sbthrash_ins_count_2420:
35      inc    %i7
36      ba     1f
37      nop
38      .align 0x800
```

```
 1    .skip 0x7C0
 2   1:
 3        stb    %i0, [%l0+10]
 4        inc    %i0
 5        add    56, %l0, %g1
 6        stda   %i0, [%g1] 0x8
 7        inc    %i0
 8        sth    %i3, [%l3+16]
 9        inc    %i3
10        st     %i0, [%l0+56]
11   sbthrash_ins_count_2430:
12        inc    %i0
13        sth    %i2, [%l2+48]
14        inc    %i2
15        sth    %i0, [%l0+20]
16        inc    %i0
17        mov    %i0, %o0
18        ldstub [%l0+11], %o0
19        inc    %i0
20        sth    %i4, [%l4+38]
21        inc    %i4
22   sbthrash_ins_count_2440:
23        st     %i1, [%l1+24]
24        inc    %i1
25        add    8, %l1, %g1
26        stha   %i1, [%g1] 0xA
27        inc    %i1
28        add    48, %l4, %g4
29        stha   %i4, [%g4] 0xB
30        inc    %i4
31        stb    %i0, [%l0+38]
32        inc    %i0
33   sbthrash_ins_count_2450:
34        sth    %i4, [%l4+24]
35        inc    %i4
36        add    2, %l3, %g3
37        stha   %i3, [%g3] 0xA
38        inc    %i3
```

```
1       stb     %i4, [%l4+11]
2       inc     %i4
3       add     40, %l4, %g4
4       sta     %i4, [%g4] 0x8
5       inc     %i4
6    sbthrash_ins_count_2460:
7       add     35, %l4, %g4
8       lduba   [%g4] 0x20, %o4
9       std     %i6, [%l6+24]
10      inc     %i6
11      fmovs   %f0, %f1
12      st      %f1, [%l6+16]
13      std     %i0, [%l0+32]
14      inc     %i0
15      add     56, %l4, %g4
16      sta     %i4, [%g4] 0x8
17   sbthrash_ins_count_2470:
18      inc     %i4
19      std     %i4, [%l4+32]
20      inc     %i4
21      add     32, %l5, %g5
22      lda     [%g5] 0x20, %o5
23      std     %i6, [%l6+0]
24      inc     %i6
25      std     %i0, [%l0+32]
26      inc     %i0
27      st      %i4, [%l4+20]
28   sbthrash_ins_count_2480:
29      inc     %i4
30      ba      1f
31      nop
32   .align 0x800
33   .skip 0x7C0
34   1:
35      add     40, %l1, %g1
36      sta     %i1, [%g1] 0x8
37      inc     %i1
38      sth     %i1, [%l1+36]
```

```
 1      inc   %i1
 2      st    %i7, [%17+56]
 3      inc   %i7
 4      add   12, %10, %g1
 5   sbthrash_ins_count_2490:
 6      stha  %i0, [%g1] 0xB
 7      inc   %i0
 8      stb   %i0, [%10+12]
 9      inc   %i0
10      std   %i6, [%16+0]
11      inc   %i6
12      sth   %i0, [%10+10]
13      inc   %i0
14      sth   %i4, [%14+30]
15      inc   %i4
16   sbthrash_ins_count_2500:
17      add   60, %10, %g1
18      stha  %i0, [%g1] 0xA
19      inc   %i0
20      add   56, %12, %g2
21      sta   %i2, [%g2] 0xB
22      inc   %i2
23      st    %i4, [%14+48]
24      inc   %i4
25      add   6, %11, %g1
26      stha  %i1, [%g1] 0xB
27   sbthrash_ins_count_2510:
28      inc   %i1
29      add   34, %17, %g7
30      stba  %i7, [%g7] 0x9
31      inc   %i7
32      lduh  [%15+14], %o5
33      st    %i3, [%13+16]
34      inc   %i3
35      st    %i3, [%13+16]
36      inc   %i3
37      fmovs %f0, %f1
38   sbthrash_ins_count_2520:
```

```
1        st      %f1, [%l5+52]
2        ba      1f
3        nop
4   .align 0x800
5   .skip 0x7C0
6   1:
7        std     %i6, [%l6+40]
8        inc     %i6
9        std     %i6, [%l6+16]
10       inc     %i6
11       sth     %i1, [%l1+62]
12       inc     %i1
13       fmovs   %f0, %f1
14       st      %f1, [%l3+16]
15  sbthrash_ins_count_2530:
16       std     %i2, [%l2+56]
17       inc     %i2
18       sth     %i1, [%l1+30]
19       inc     %i1
20       mov     %i1, %o1
21       ldstub  [%l1+35], %o1
22       inc     %i1
23       std     %i2, [%l2+24]
24       inc     %i2
25       stb     %i5, [%l5+22]
26  sbthrash_ins_count_2540:
27       inc     %i5
28       ba      1f
29       nop
30  .align 0x800
31  .skip 0x7C0
32  1:
33       st      %i7, [%l7+8]
34       inc     %i7
35       st      %i0, [%l0+0]
36       inc     %i0
37       std     %i2, [%l2+24]
38       inc     %i2
```

```
1       add    44, %l0, %g1
2       stha   %i0, [%g1] 0x8
3  sbthrash_ins_count_2550:
4       inc    %i0
5       stb    %i5, [%l5+25]
6       inc    %i5
7       ld     [%l5+0], %f0
8       fmovs  %f0, %f1
9       std    %i0, [%l0+16]
10      inc    %i0
11      std    %i4, [%l4+16]
12      inc    %i4
13      add    8, %l4, %g4
14 sbthrash_ins_count_2560:
15      stda   %i4, [%g4] 0xB
16      inc    %i4
17      std    %i2, [%l2+24]
18      inc    %i2
19      ld     [%l3+20], %o3
20      ldsb   [%l6+27], %o6
21      stb    %i6, [%l6+61]
22      inc    %i6
23      add    17, %l3, %g3
24      stba   %i3, [%g3] 0x8
25 sbthrash_ins_count_2570:
26      inc    %i3
27      std    %i0, [%l0+16]
28      inc    %i0
29      add    48, %l2, %g2
30      stda   %i2, [%g2] 0xB
31      inc    %i2
32      sth    %i5, [%l5+24]
33      inc    %i5
34      add    56, %l6, %g6
35      ldda   [%g6] 0x20, %o6
36 sbthrash_ins_count_2580:
37      stb    %i0, [%l0+62]
38      inc    %i0
```

```
1       std     %i0, [%l0+40]
2       inc     %i0
3       st      %i3, [%l3+12]
4       inc     %i3
5       st      %i5, [%l5+48]
6       inc     %i5
7       add     16, %l6, %g6
8       stda    %i6, [%g6] 0x8
9    sbthrash_ins_count_2590:
10      inc     %i6
11      add     36, %l1, %g1
12      stha    %i1, [%g1] 0xA
13      inc     %i1
14      add     50, %l7, %g7
15      stba    %i7, [%g7] 0x9
16      inc     %i7
17      add     36, %l2, %g2
18      stha    %i2, [%g2] 0xB
19      inc     %i2
20   sbthrash_ins_count_2600:
21      add     30, %l4, %g4
22      stha    %i4, [%g4] 0xA
23      inc     %i4
24      st      %i0, [%l0+16]
25      inc     %i0
26      add     8, %l4, %g4
27      stba    %i4, [%g4] 0x8
28      inc     %i4
29      ldub    [%l7+61], %o7
30      st      %i5, [%l5+36]
31   sbthrash_ins_count_2610:
32      inc     %i5
33      add     16, %l3, %g3
34      lda     [%g3] 0x20, %o3
35      st      %i7, [%l7+60]
36      inc     %i7
37      st      %i0, [%l0+0]
38      inc     %i0
```

```
1       add   56, %12, %g2
2       stda  %i2, [%g2] 0xB
3       inc   %i2
4   sbthrash_ins_count_2620:
5       std   %i4, [%14+24]
6       inc   %i4
7       stb   %i5, [%15+4]
8       inc   %i5
9       add   16, %14, %g4
10      stda  %i4, [%g4] 0x9
11      inc   %i4
12      add   40, %10, %g1
13      sta   %i0, [%g1] 0xB
14      inc   %i0
15  sbthrash_ins_count_2630:
16      ldd   [%12+16], %o2
17      ld    [%16+44], %o6
18      add   0, %14, %g4
19      stha  %i4, [%g4] 0x9
20      inc   %i4
21      add   40, %10, %g1
22      stda  %i0, [%g1] 0xB
23      inc   %i0
24      add   40, %14, %g4
25      ldda  [%g4] 0x20, %o4
26  sbthrash_ins_count_2640:
27      sth   %i7, [%17+18]
28      inc   %i7
29      add   0, %10, %g1
30      ldda  [%g1] 0x20, %o0
31      add   24, %16, %g6
32      stda  %i6, [%g6] 0xB
33      inc   %i6
34      st    %i4, [%14+40]
35      inc   %i4
36      add   0, %10, %g1
37  sbthrash_ins_count_2650:
38      ldda  [%g1] 0x20, %o0
```

```
1       stb     %i7, [%l7+27]
2       inc     %i7
3       st      %i4, [%l4+20]
4       inc     %i4
5       sth     %i4, [%l4+16]
6       inc     %i4
7       std     %i4, [%l4+8]
8       inc     %i4
9       sth     %i3, [%l3+40]
10   sbthrash_ins_count_2660:
11      inc     %i3
12      ba      1f
13      nop
14   .align 0x800
15   .skip 0x7C0
16   1:
17      ld      [%l5+52], %o5
18      stb     %i3, [%l3+0]
19      inc     %i3
20      add     8, %l6, %g6
21      stda    %i6, [%g6] 0x8
22      inc     %i6
23      stb     %i1, [%l1+20]
24      inc     %i1
25   sbthrash_ins_count_2670:
26      st      %i3, [%l3+16]
27      inc     %i3
28      std     %i2, [%l2+16]
29      inc     %i2
30      sth     %i0, [%l0+16]
31      inc     %i0
32      stb     %i0, [%l0+55]
33      inc     %i0
34      sth     %i5, [%l5+38]
35      inc     %i5
36   sbthrash_ins_count_2680:
37      stb     %i0, [%l0+17]
38      inc     %i0
```

```
1       add   56, %l1, %g1
2       sta   %i1, [%g1] 0xA
3       inc   %i1
4       ld    [%l0+36], %f0
5       fmovs %f0, %f1
6       add   40, %l4, %g4
7       stda  %i4, [%g4] 0xB
8       inc   %i4
9    sbthrash_ins_count_2690:
10      add   60, %l6, %g6
11      lda   [%g6] 0x20, %o6
12      add   53, %l4, %g4
13      stba  %i4, [%g4] 0x9
14      inc   %i4
15      st    %i5, [%l5+20]
16      inc   %i5
17      ld    [%l1+16], %o1
18      std   %i2, [%l2+32]
19      inc   %i2
20   sbthrash_ins_count_2700:
21      mov   %i0, %o0
22      ldstub [%l0+23], %o0
23      inc   %i0
24      st    %i2, [%l2+0]
25      inc   %i2
26      std   %i6, [%l6+16]
27      inc   %i6
28      stb   %i0, [%l0+41]
29      inc   %i0
30      sth   %i4, [%l4+8]
31   sbthrash_ins_count_2710:
32      inc   %i4
33      ld    [%l6+44], %f0
34      fmovs %f0, %f1
35      std   %i4, [%l4+16]
36      inc   %i4
37      stb   %i5, [%l5+10]
38      inc   %i5
```

```
1       add     8, %l4, %g4
2       ldda    [%g4] 0x20, %o4
3       add     42, %l1, %g1
4    sbthrash_ins_count_2720:
5       stha    %i1, [%g1] 0x9
6       inc     %i1
7       add     26, %l1, %g1
8       stha    %i1, [%g1] 0xB
9       inc     %i1
10      st      %i2, [%l2+20]
11      inc     %i2
12      add     16, %l4, %g4
13      stda    %i4, [%g4] 0xA
14      inc     %i4
15   sbthrash_ins_count_2730:
16      stb     %i6, [%l6+15]
17      inc     %i6
18      st      %i5, [%l5+20]
19      inc     %i5
20      st      %i3, [%l3+32]
21      inc     %i3
22      add     36, %l0, %g1
23      ldsba   [%g1] 0x20, %o0
24      stb     %i1, [%l1+39]
25      inc     %i1
26   sbthrash_ins_count_2740:
27      add     54, %l5, %g5
28      stha    %i5, [%g5] 0x8
29      inc     %i5
30      sth     %i0, [%l0+54]
31      inc     %i0
32      add     30, %l1, %g1
33      stha    %i1, [%g1] 0x8
34      inc     %i1
35      mov     %i2, %o2
36      ldstub  [%l2+31], %o2
37   sbthrash_ins_count_2750:
38      inc     %i2
```

```
1       st      %i0, [%l0+4]
2       inc     %i0
3       stb     %i2, [%l2+24]
4       inc     %i2
5       mov     %i2, %o2
6       ldstub  [%l2+4], %o2
7       inc     %i2
8       sth     %i5, [%l5+50]
9       inc     %i5
10  sbthrash_ins_count_2760:
11      std     %i0, [%l0+16]
12      inc     %i0
13      add     58, %l6, %g6
14      stha    %i6, [%g6] 0xA
15      inc     %i6
16      stb     %i2, [%l2+8]
17      inc     %i2
18      mov     %i2, %o2
19      ldstub  [%l2+38], %o2
20      inc     %i2
21  sbthrash_ins_count_2770:
22      sth     %i1, [%l1+30]
23      inc     %i1
24      std     %i2, [%l2+32]
25      inc     %i2
26      std     %i4, [%l4+32]
27      inc     %i4
28      add     48, %l1, %g1
29      stba    %i1, [%g1] 0xB
30      inc     %i1
31      stb     %i3, [%l3+9]
32  sbthrash_ins_count_2780:
33      inc     %i3
34      ba      1f
35      nop
36      .align  0x800
37      .skip   0x7C0
38  1:
```

```
1       add   47, %l1, %g1
2       stba  %i1, [%g1] 0x8
3       inc   %i1
4       add   24, %l6, %g6
5       stda  %i6, [%g6] 0xB
6       inc   %i6
7       add   24, %l0, %g1
8       stda  %i0, [%g1] 0x8
9   sbthrash_ins_count_2790:
10      inc   %i0
11      add   58, %l6, %g6
12      ldsba [%g6] 0x20, %o6
13      add   36, %l5, %g5
14      sta   %i5, [%g5] 0xA
15      inc   %i5
16      sth   %i2, [%l2+10]
17      inc   %i2
18      st    %i7, [%l7+20]
19      inc   %i7
20  sbthrash_ins_count_2800:
21      fmovs %f0, %f1
22      st    %f1, [%l7+60]
23      ldub  [%l7+31], %o7
24      fmovs %f0, %f1
25      st    %f1, [%l5+36]
26      std   %i4, [%l4+16]
27      inc   %i4
28      std   %i2, [%l2+0]
29      inc   %i2
30      ldd   [%l4+8], %o4
31  sbthrash_ins_count_2810:
32      add   56, %l4, %g4
33      stda  %i4, [%g4] 0x9
34      inc   %i4
35      mov   %i7, %o7
36      ldstub [%l7+56], %o7
37      inc   %i7
38      add   63, %l6, %g6
```

```
1         lduba       [%g6] 0x20, %o6
2         sth   %i7, [%l7+28]
3         inc   %i7
4   sbthrash_ins_count_2820:
5         add   24, %l1, %g1
6         lduba       [%g1] 0x20, %o1
7         std   %i6, [%l6+0]
8         inc   %i6
9         sth   %i1, [%l1+52]
10        inc   %i1
11        fmovs       %f0, %f1
12        st    %f1, [%l3+28]
13        add   57, %l3, %g3
14        stba  %i3, [%g3] 0xB
15  sbthrash_ins_count_2830:
16        inc   %i3
17        add   8, %l2, %g2
18        stha  %i2, [%g2] 0xB
19        inc   %i2
20        add   16, %l0, %g1
21        stda  %i0, [%g1] 0x9
22        inc   %i0
23        fmovs       %f0, %f1
24        st    %f1, [%l5+0]
25        st    %i5, [%l5+44]
26  sbthrash_ins_count_2840:
27        inc   %i5
28        ba    1f
29        nop
30  .align 0x800
31  .skip 0x7C0
32  1:
33        add   54, %l3, %g3
34        stba  %i3, [%g3] 0x8
35        inc   %i3
36        stb   %i0, [%l0+34]
37        inc   %i0
38        add   20, %l2, %g2
```

```
1       sta   %i2, [%g2] 0xB
2       inc   %i2
3    sbthrash_ins_count_2850:
4       sth   %i4, [%14+38]
5       inc   %i4
6       add   44, %14, %g4
7       stba  %i4, [%g4] 0xA
8       inc   %i4
9       std   %i2, [%12+0]
10      inc   %i2
11      lduh  [%13+4], %o3
12      stb   %i4, [%14+12]
13      inc   %i4
14   sbthrash_ins_count_2860:
15      stb   %i1, [%11+0]
16      inc   %i1
17      std   %i0, [%10+40]
18      inc   %i0
19      sth   %i6, [%16+22]
20      inc   %i6
21      add   20, %10, %g1
22      sta   %i0, [%g1] 0xB
23      inc   %i0
24      stb   %i7, [%17+41]
25   sbthrash_ins_count_2870:
26      inc   %i7
27      sth   %i5, [%15+54]
28      inc   %i5
29      add   57, %15, %g5
30      stba  %i5, [%g5] 0x9
31      inc   %i5
32      std   %i4, [%14+56]
33      inc   %i4
34      stb   %i7, [%17+55]
35      inc   %i7
36   sbthrash_ins_count_2880:
37      stb   %i3, [%13+2]
38      inc   %i3
```

```
1        std    %i0, [%l0+56]
2        inc    %i0
3        sth    %i6, [%l6+48]
4        inc    %i6
5        sth    %i1, [%l1+2]
6        inc    %i1
7        sth    %i0, [%l0+22]
8        inc    %i0
9    sbthrash_ins_count_2890:
10       st     %i7, [%l7+8]
11       inc    %i7
12       ldub   [%l7+9], %o7
13       add    8, %l2, %g2
14       stda   %i2, [%g2] 0x8
15       inc    %i2
16       std    %i2, [%l2+32]
17       inc    %i2
18       sth    %i3, [%l3+2]
19       inc    %i3
20   sbthrash_ins_count_2900:
21       stb    %i4, [%l4+21]
22       inc    %i4
23       ld     [%l4+60], %o4
24       st     %i0, [%l0+4]
25       inc    %i0
26       add    0, %l0, %g1
27       stda   %i0, [%g1] 0x8
28       inc    %i0
29       std    %i6, [%l6+48]
30       inc    %i6
31   sbthrash_ins_count_2910:
32       add    40, %l1, %g1
33       sta    %i1, [%g1] 0xB
34       inc    %i1
35       sth    %i3, [%l3+28]
36       inc    %i3
37       ldsh   [%l3+24], %o3
38       std    %i4, [%l4+16]
```

```
1       inc   %i4
2       ldsb  [%16+35], %o6
3       add   28, %16, %g6
4   sbthrash_ins_count_2920:
5       sta   %i6, [%g6] 0xA
6       inc   %i6
7       add   32, %10, %g1
8       stda  %i0, [%g1] 0x9
9       inc   %i0
10      stb   %i7, [%17+35]
11      inc   %i7
12      mov   %i7, %o7
13      ldstub   [%17+11], %o7
14      inc   %i7
15  sbthrash_ins_count_2930:
16      fmovs    %f0, %f1
17      st    %f1, [%10+52]
18      add   56, %17, %g7
19      sta   %i7, [%g7] 0xA
20      inc   %i7
21      st    %i6, [%16+52]
22      inc   %i6
23      st    %i5, [%15+44]
24      inc   %i5
25      std   %i4, [%14+48]
26  sbthrash_ins_count_2940:
27      inc   %i4
28      ba    1f
29      nop
30      .align 0x800
31      .skip 0x7C0
32  1:
33      add   48, %12, %g2
34      sta   %i2, [%g2] 0x8
35      inc   %i2
36      add   32, %14, %g4
37      stda  %i4, [%g4] 0xB
38      inc   %i4
```

```
1        ldd    [%l0+48], %o0
2        ld     [%l4+44], %o4
3   sbthrash_ins_count_2950:
4        sth    %i3, [%l3+22]
5        inc    %i3
6        stb    %i1, [%l1+56]
7        inc    %i1
8        stb    %i4, [%l4+7]
9        inc    %i4
10       std    %i2, [%l2+24]
11       inc    %i2
12       sth    %i0, [%l0+0]
13       inc    %i0
14  sbthrash_ins_count_2960:
15       add    16, %l6, %g6
16       ldda   [%g6] 0x20, %o6
17       add    0, %l4, %g4
18       stda   %i4, [%g4] 0x8
19       inc    %i4
20       st     %i3, [%l3+4]
21       inc    %i3
22       std    %i2, [%l2+40]
23       inc    %i2
24       st     %i1, [%l1+0]
25  sbthrash_ins_count_2970:
26       inc    %i1
27       add    10, %l4, %g4
28       stba   %i4, [%g4] 0x9
29       inc    %i4
30       ld     [%l4+44], %o4
31       add    50, %l0, %g1
32       ldsha  [%g1] 0x20, %o0
33       st     %i5, [%l5+48]
34       inc    %i5
35       stb    %i0, [%l0+12]
36  sbthrash_ins_count_2980:
37       inc    %i0
38       ba     1f
```

```
1       nop
2       .align 0x800
3       .skip 0x7C0
4    1:
5       add   8, %l2, %g2
6       stda  %i2, [%g2] 0xB
7       inc   %i2
8       add   4, %l2, %g2
9       sta   %i2, [%g2] 0xB
10      inc   %i2
11      stb   %i6, [%l6+47]
12      inc   %i6
13   sbthrash_ins_count_2990:
14      sth   %i2, [%l2+44]
15      inc   %i2
16      sth   %i3, [%l3+38]
17      inc   %i3
18      sth   %i6, [%l6+18]
19      inc   %i6
20      std   %i0, [%l0+48]
21      inc   %i0
22      st    %i3, [%l3+28]
23      inc   %i3
24   sbthrash_ins_count_3000:
25      ldsb  [%l5+11], %o5
26      ba    1f
27      nop
28   .align 0x800
29   .skip 0x7C0
30   1:
31   /* !c_end */
32
33
34   /* !nawk_begin */
35
36
37   !     Store o register values
38      st    %o0, [%l0]
```

```
1       st    %o1, [%l1]
2       st    %o2, [%l2]
3       st    %o3, [%l3]
4       st    %o4, [%l4]
5       st    %o5, [%l5]
6       st    %o6, [%l6]
7       st    %o7, [%l7]
8    /* !nawk_end */
9
10
11      ta    GOOD_TRAP
12   user_text_end:
13
```

What is claimed is:

1. A method of generating assembler code comprising the steps of:
    forming an embedded file comprising source code written in more than one high level language and embedded assembler code wherein said high level language is a general computer language having rich data and control structures and output capabilites suitable for writing programs that can be expanded into assembler code statements;
    scanning said embedded file to parse said source code into more than one section of source code, each section of source code being of a same high level language;
    for each said section of source code, expanding said source code to provide expanded assembler code;
    forming an output file of expanded assembler code as a result of said expansion; and
    positioning said embedded assembler code in said output file in proper sequence.

2. A method as in claim 1 wherein said step of parsing comprises the step of locating a beginning and ending string associated with each of said sections of source code.

3. A method as in claim 2 wherein said step of providing said embedded file comprises the step of including a beginning and ending string associated with each of said sections of code.

4. A method as in claim 2 wherein said beginning string indicates the high level language of the associated section of code.

5. A method of executing code comprising the steps of:
    scanning an embedded file comprising source code written in more than one high level language and embedded assembler code wherein said high level language is a general computer language having rich data and control structures and output capabilities suitable for writing programs that can be expanded into assembler code statements;
    parsing said source code into more than one section of code, each section of source code being of a same high level language;
    for each said section of source code, expanding said source code to provide expanded assembler code; and
    executing said expanded assembler code and said embedded assembler code in proper sequence with respect to said expanded assembler code.

6. A method as in claim 5 wherein said step of parsing comprises the step of locating a beginning and ending string associated with each of said sections of high level language code.

7. A method as in claim 6 wherein said beginning string indicates the high level language of the associated section of source code.

8. A method of validating an electronic circuit comprising the steps of:
    scanning an embedded file comprising source code written in more than one high level language and embedded assembler code wherein said high level language is a general computer language having rich data and control structures and output capabilities suitable for writing programs that can be expanded into assembler code statements;
    parsing said source code into more than one section of source code, each section of source code being of a same high level language;
    for each said section of source code, expanding said source code to provide expanded assembler code;
    executing said expanded assembler code and said embedded assembler code in proper sequence with respect to said expanded assembler code to apply test signals to said electronic circuit; and
    monitoring the resultant output signals from said electronic circuit to determine proper function of said electronic circuit.

9. A method as in claim 8 wherein said step of scanning said embedded file comprises the step of locating a beginning and ending string associated with each of said sections of code.

10. A method as in claim 9 wherein said beginning string defined the high level language of the associated section of code.

11. A method of generating assembler code comprising the steps of:
    forming an embedded file comprising source code written in more than one high level language;
    scanning said embedded file to parse said source code into more than one section of source code, each section of source code being of a same high level language;
    for each said section of source code, expanding said source code to provide assembler code; and
    forming an output file of assembler code as a result of said expansion.

12. A method as in claim 11 wherein said embedded file further comprises assembler code, and said step of forming said output file further comprises the step of copying said assembler code from said embedded file to said output file in proper sequence.

13. A method as in claim 11 wherein said step of parsing comprises the step of locating a beginning and ending string associated with each of said sections of source code.

14. A method as in claim 13 wherein said step of providing said embedded file comprises the step of including a beginning and ending string associated with each of said sections of code.

15. A method as in claim 14 wherein said beginning string indicates the high level language of the associated section of code.

16. A method of executing code comprising the steps of:
    scanning an embedded file comprising source code written in more than one high level language wherein said high level language is a general computer language having rich data and control structures and output capabilities suitable for writing programs that can be expanded into assembler code statements;
    parsing said source code into more than one section of code, each section of source code being of a same high level language;
    for each said section of source code, expanding said source code to provide assembler code; and
    executing said assembler code obtained as a result of said expansion.

17. A method as in claim 16 wherein said embedded file further comprises assembler code, and said step of executing comprises the step of executing said assembler code from said embedded file in proper sequence.

18. A method as in claim 16 wherein said step of parsing comprises the step of locating a beginning and ending string associated with each of said sections of high level language code.

19. A method as in claim 18 wherein said beginning string indicates the high level language of the associated section of source code.

20. A method of validating an electronic circuit comprising the steps of:
    scanning an embedded file comprising source code written in more than one high level language wherein said high level language is a general computer language having rich data and control structures and output capabilities suitable for writing programs that can be expanded into assembler code statements;

parsing said source code into more than one section of source code, each section of source code being of a same high level language;

for each said section of source code, expanding said source code to provide assembler code;

executing said assembler code obtained as a result of said expansion to apply test signals to said electronic circuit; and monitoring the resultant output signals from said electronic circuit to determine proper function of said electronic circuit.

21. A method as in claim 20 wherein said embedded file further comprises assembler code, and said step of executing said assembler code further comprises the step of executing said assembler code from said embedded file in proper sequence.

22. A method as in claim 20 wherein said step of scanning said embedded file comprises the step of locating a beginning and ending string associated with each of said sections of code.

23. A method as in claim 22 wherein said beginning string defined the high level language of the associated section of code.

* * * * *

UNITED STATES PATENT AND TRADEMARK OFFICE
CERTIFICATE OF CORRECTION

PATENT NO.   : 6,061,519
DATED        : May 9, 2000
INVENTOR(S)  : RATHNAM

It is certified that error appears in the above-identified patent and that said Letters Patent is hereby corrected as shown below:

At Col. 224, line 16, after "language" and before the semicolon (;) insert --wherein said high level language is a general computer language having rich data and control structures and output capabilities suitable for writing programs that can be expanded into assembler code statements--.

Signed and Sealed this

Third Day of April, 2001

*Attest:*

NICHOLAS P. GODICI

*Attesting Officer*    *Acting Director of the United States Patent and Trademark Office*